(12) United States Patent  
Jang et al.

(10) Patent No.: US 10,148,321 B2  
(45) Date of Patent: Dec. 4, 2018

(54) ANTENNA FOR NEAR FIELD COMMUNICATION, ACCESSORY AND ELECTRONIC DEVICE INCLUDING THE SAME

(71) Applicant: SAMSUNG ELECTRONICS CO., LTD., Suwon-si (KR)

(72) Inventors: Yohan Jang, Seoul (KR); Iljong Song, Suwon-si (KR); Hyounghwan Roh, Seoul (KR); Youngki Lee, Incheon (KR); Jaesuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/464,845

(22) Filed: Mar. 21, 2017

(65) Prior Publication Data

US 2017/0272127 A1 Sep. 21, 2017

Related U.S. Application Data

(60) Provisional application No. 62/311,006, filed on Mar. 21, 2016.

(30) Foreign Application Priority Data

Jun. 1, 2016 (KR) .......................... 10-2016-0068226

(51) Int. Cl.
*H04B 5/00* (2006.01)

(52) U.S. Cl.
CPC .......... *H04B 5/0081* (2013.01); *H04B 5/0031* (2013.01); *H04B 5/0056* (2013.01)

(58) Field of Classification Search
CPC .......... H01F 38/14; H01F 27/02; H01Q 1/243; H03H 9/205; H05K 1/181; H04M 1/0249; H04W 4/008
USPC .................................... 455/41.1, 41.2, 575.8
See application file for complete search history.

(56) References Cited

U.S. PATENT DOCUMENTS

| | | | |
|---|---|---|---|
| 9,330,383 B1 * | 5/2016 | Vadera | ................. G06Q 20/352 |
| 2013/0194155 A1 * | 8/2013 | Kuroda | ............... H01Q 1/2208 343/867 |
| 2014/0253396 A1 | 9/2014 | Cho | |
| 2014/0335784 A1 | 11/2014 | Ozenne et al. | |
| 2015/0180542 A1 | 6/2015 | Jang et al. | |
| 2015/0295623 A1 | 10/2015 | Li et al. | |
| 2016/0013827 A1 | 1/2016 | Hubinak et al. | |

FOREIGN PATENT DOCUMENTS

| | | |
|---|---|---|
| JP | 2012-038016 A | 2/2012 |
| JP | 5208845 B2 | 6/2013 |
| KR | 10-0856831 B1 | 9/2008 |
| KR | 10-2010-0062539 A | 6/2010 |

(Continued)

OTHER PUBLICATIONS

Communication dated Jul. 28, 2017 by the European Patent Office in counterpart European Patent Application No. 17162162.6-1874.

*Primary Examiner* — Tu X Nguyen  
(74) *Attorney, Agent, or Firm* — Sughrue Mion, PLLC

(57) ABSTRACT

An electronic device that includes a near field communication (NFC) antenna and a mobile device is provided. The NFC antenna includes a first coil and a second coil separated from the first coil. The mobile device includes the first coil. The second coil is arranged on the outside of the mobile device.

14 Claims, 31 Drawing Sheets

(56) References Cited

FOREIGN PATENT DOCUMENTS

| | | |
|---|---|---|
| KR | 10-2013-0022619 A | 3/2013 |
| KR | 10-1471504 B1 | 12/2014 |
| KR | 10-2011-0064403 A | 10/2015 |
| KR | 10-2015-0117742 A | 10/2015 |
| KR | 10-1556666 B1 | 10/2015 |
| KR | 10-2015-0141366 A | 12/2015 |

* cited by examiner

ANTENNA FOR NEAR FIELD COMMUNICATION, ACCESSORY AND ELECTRONIC DEVICE INCLUDING THE SAME

CROSS-REFERENCE TO RELATED APPLICATIONS

This application claims the benefit of U.S. Provisional Application No. 62/311,006 filed Mar. 21, 2016, in the U.S. Patent and Trademark Office, and claims priority from Korean Patent Application No. 10-2016-0068226 filed Jun. 1, 2016, in the Korean Intellectual Property Office. The contents of the above-listed applications are hereby incorporated by reference in their entireties.

BACKGROUND

Embodiments of the inventive concept described herein relate to an electronic device for near field communication (NFC) including a mobile device and an accessory.

A radio frequency identification (RFID) system belongs to an automatic recognition field using micro waves and wirelessly recognizes information, which is stored in advance, by using micro waves such as ultra-short waves or long waves. According to an operating principle of the RFID system, a reader may obtain unique information of goods in which a tag is mounted, by receiving and analyzing information stored in the tag.

The RFID system includes a reader, an antenna, and a tag. The antenna is in charge of a relay role between the tag and the reader. The reader may activate the tag by transmitting electric power and a signal of a specific frequency to the tag and may receive a response from the activated tag.

NFC is a field of the RFID and is defined in the ISO/IEC 18092 as the standard of wireless communication in which a frequency of 13.56 MHz is used and data is transmitted within a short distance. The NFC may perform near field wireless communication by using various frequencies, such as 125 KHz, 135 KHz, and 900 MHz, in addition to the frequency of 13.56 MHz.

The NFC makes it possible to transmit and receive data between adjacent devices. For example, the devices may include smartphones, tablet PCs, notebook computers, digital cameras, smart watches, etc. For example, the data may include credit card information, transportation card information, mobile coupon information, ticket information, video information, etc. Since the stability of the NFC using a specific frequency band is high, the NFC may be used for mobile payment or settlement of the transportation card. The NFC may be utilized in an information terminal that accesses a tag, which stores information, to obtain a variety of information.

The NFC may operate in a peer to peer (P2P) mode, a card emulation mode, or a reader mode. The P2P mode refers to a mode in which data is transmitted and received between two devices each supporting the NFC. The card emulation mode refers to a mode in which a device supporting the NFC operates like a tag of an existing RFID card. The reader mode refers to a mode in which a device supporting the NFC reads information from a specific tag.

In the related art, a battery of a mobile device is detachable, and an antenna may be arranged in the battery or in a battery case. Accordingly, the related art mobile device may have the contact terminals that are arranged in the battery, the battery case, or the mobile device. Recently, the mobile devices have been introduced with the batteries integrated therein, which makes it difficult, if not impossible, to arrange the antenna of appropriate characteristics in the battery or in a battery case as in the related art mobile device. Further, there is a limited degree of freedom for arranging an antenna, as an additional component, in a mobile device because of the space already occupied by a battery, a camera, a printed circuit board (PCB), a universal subscriber identity module (USIM) chip reader, etc. Due to the above-described issues, the recent mobile devices cannot support many mobile payment and settlement functions.

For example, a smartphone in which an NFC chip is embedded may be used as a purchase means by inputting personal card information to the smartphone. However, due to restrictions on the size and performance of the antenna, the smartphone in which an NFC chip is embedded has a problem in that it cannot often process a payment because it might not recognize an external mobile card or credit card due to the antenna restrictions.

SUMMARY

One or more exemplary embodiments provide an electronic device in which an antenna is arranged in an accessory.

According to an aspect of an exemplary embodiment, there is provided an electronic device which includes an NFC antenna and a mobile device. The NFC antenna includes a first coil and a second coil separated from the first coil. The mobile device includes the first coil. The second coil is arranged on the outside of the mobile device.

According to an aspect of another exemplary embodiment, there is provided an accessory apparatus which includes at least a portion of an NFC antenna. The NFC antenna includes a first coil and a second coil, wherein at least one among the first coil and the second coil is arranged in the accessory apparatus. The accessory apparatus is removably attachable to a mobile device.

According to an aspect of another exemplary embodiment, there is provided an NFC antenna which includes a first coil and a second coil. The first coil is arranged in a mobile device. The second coil is separated from the first coil and is arranged on the outside of the mobile device. A distance between the first coil and the second coil ranges from 0 mm to 10 mm.

According to an aspect of another exemplary embodiment, there is provided an electronic apparatus including: a mobile device housed in a case and including an NFC transceiver; and an NFC antenna configured to communicate with the NFC transceiver and including: a first coil disposed within the case of the mobile device, and a second coil physically separated from the first coil and arranged external to the case of the mobile device.

BRIEF DESCRIPTION OF THE FIGURES

The above and/or other aspects will become more apparent by describing certain exemplary embodiments with reference to the accompanying drawings, in which.

DETAILED DESCRIPTION

Figure 1:
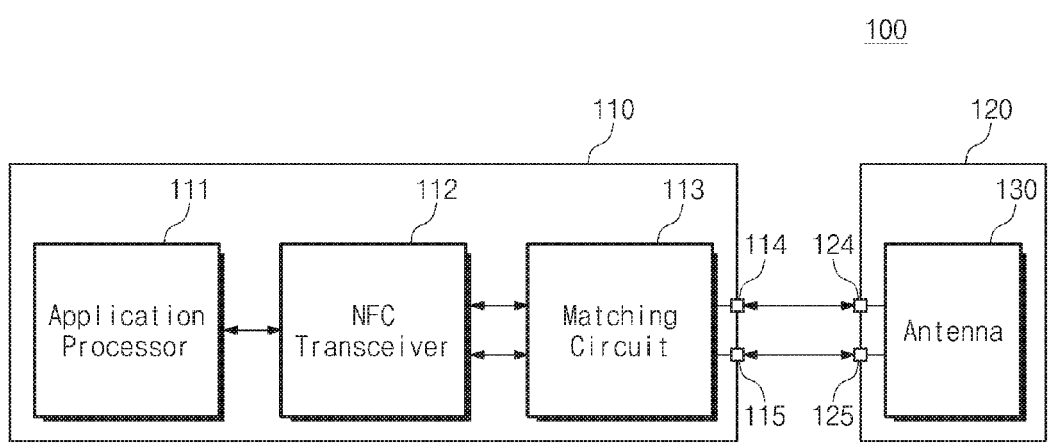
FIG. 1 is a block diagram illustrating an electronic device according to an exemplary embodiment.

FIG. 1 is a block diagram illustrating an electronic device according to an exemplary embodiment. Referring to FIG. 1, an electronic device 100 may include a mobile device 110 and an accessory 120.

The mobile device 110 may be a mobile phone, a smartphone, a tablet PC, a notebook computer, a digital camera, a smart ring, a smart watch, etc. The mobile device 110 may support the NFC. The mobile device 110 may transmit and receive data to and from another mobile device.

The accessory 120 may be attached to all or a part of the mobile device 110. The accessory 120 may be detached from and attached to the mobile device 110. For example, the accessory 120 may be formed of leather, urethane, metal, etc. For example, the accessory 120 may be a film that is completely attached on one surface of the mobile device 110. For example, the accessory 120 may be a cover, a sticker, an antiskid pad, a film, an auxiliary battery, a smart grip, etc. However, the accessory 120 is not limited thereto. For example, the accessory 120 may be manufactured in various forms to protect the mobile device 110. The accessory 120 may be manufactured in various forms to improve the aesthetic sense of the mobile device 110.

Referring to FIG. 1, the mobile device 110 may include an application processor 111, an NFC transceiver 112, a matching circuit 113, and terminals 114 and 115.

The application processor 111 may include hardware circuits (e.g., one or more processors or microprocessors) and may operate to provide various user applications of the electronic device 100. The user applications may include voice call operations, data transmission, etc.

The application processor 111 may execute programs that make it possible for the electronic device 100 to transmit and receive information, such as photos and videos, to and from another mobile device. The application processor 111 may execute programs that make it possible for the electronic device 100 to operate as a card. The application processor 111 may execute programs for a mobile point of sale (mPOS). The programs may provide credit card purchase and payment functions using the electronic device 100.

The NFC transceiver 112 may be configured to transmit and receive NFC signals by using the inductive coupling for wireless communication. The NFC transceiver 112 may provide the NFC signals to the antenna 130 through the matching circuit 113. The antenna 130 may transmit the NFC signals through the inductive coupling. The antenna 130 may receive the NFC signals (provided from another electronic device capable of transmitting and receiving the NFC signals). The antenna 130 may provide the NFC signals to the NFC transceiver 112 through the matching circuit 113.

The NFC transceiver 112 may comply with rules that are described in the NFC interface and protocol-1 (NFCIP-1) and the NFC interface and protocol-2 (NFCIP-2) and are standardized in ECMA-340, ISO/IEC 18092, ETSI TS 102 190, ISO/IEC 21481, ECMA 352, ETSI TS 102 312, etc.

The matching circuit 113 may be connected with the NFC transceiver 112, e.g., input/output of the NFC transceiver 112, and with the antenna 130, e.g., input/output of the antenna 130. In the case where the electronic device 100 performs an NFC, the matching circuit may include an electromagnetic compatibility (EMC) filter that lowers a 13.56 MHz frequency harmonic component. The matching circuit 113 may include a capacitor for impedance matching.

The impedance matching may be needed to transmit and receive signals between the NFC transceiver 112 and the antenna 130. A detailed structure of the matching circuit 113 will be described with reference to FIG. 5.

The terminals 114 and 115 may be connected with the matching circuit 113. The terminals 114 and 115 may be physically or electrically connected with terminals 124 and 125. For example, the terminals 114 and 115 may be directly connected with the terminals 124 and 125 or may be connected with the terminals 124 and 125 by using wires or other appropriate coupling.

Referring to FIG. 1, the accessory 120 may include the terminals 124 and 125 and an antenna 130. The terminals 124 and 125 may be connected with the antenna 130.

The antenna 130 may be connected with the matching circuit 113 through the terminals 114, 115, 124, and 125. The antenna 130 may be provided with signals, which are generated by the application processor 111, through the NFC transceiver 112 and the matching circuit 113. The antenna 130 may be used for receiving external NFC signals. The antenna 130 may be used for transmitting the NFC signals to another mobile device, a card, a card reader, etc. The antenna 130 may be used for transmitting and receiving the NFC signals by the inductive coupling.

Referring to FIG. 1, the electronic device 100 according to an exemplary embodiment may include the antenna 130 that is arranged in the interior of the accessory 120. As such, the degree of freedom in placement of the antenna may be improved.

Figure 2:
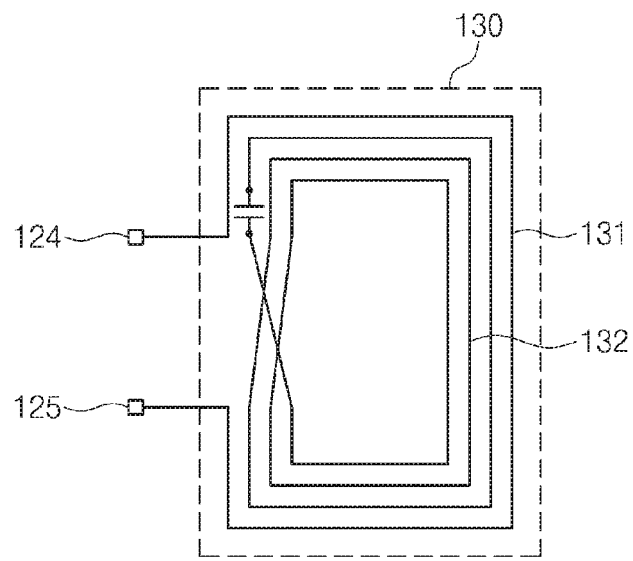
FIG. 2 is a view illustrating an antenna according to an exemplary embodiment.
Figure 3:
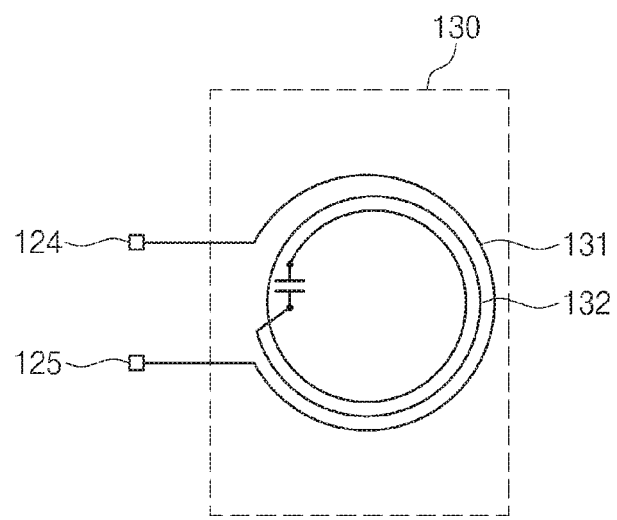
FIG. 3 is a view illustrating an antenna according to an exemplary embodiment.

FIGS. 2 to 3 are views illustrating the antenna illustrated in FIG. 1. Referring to FIGS. 2 and 3, the antenna 130 may include a first coil 131 and a second coil 132. The first coil 131 may be connected with the terminals 124 and 125. The first coil 131 and the second coil 132 may be arranged to be separated from each other. Referring to FIG. 2, each of the first coil 131 and the second coil 132 may be implemented in a rectangular spiral form. Referring to FIG. 3, each of the first coil 131 and the second coil 132 may be implemented in a helical form.

A thickness, a width, a location, or the number of turns of each of the first and second coils 131 and 132 or a distance between the first and second coils 131 and 132 may be determined by inductance or capacitance needed for a resonance frequency. The number of turns, a width, a length, a location, and a thickness of each of the first coil 131 and the second coil 132 are not limited to FIGS. 2 and 3. Also, referring to FIGS. 2 and 3, an area where the first and second coils 131 and 132 are overlapped with each other exists. The overlapped area may be isolated by an insulating material. For example, a coil may be arranged in a plurality of layers through a via, and insulating materials may be arranged among the layers.

The first coil 131 and the second coil 132 may be formed using various materials. For example, copper or a Litz-wire may be used as the materials. The first coil 131 and the second coil 132 may be formed on a PCB or a flexible PCB. The first coil 131 or the second coil 132 according to an exemplary embodiment may be formed in various forms or various materials without being limited to FIGS. 2 and 3.

Referring to FIGS. 2 and 3, a capacitor may be connected to opposite ends of the second coil 132. The capacitor may be connected to the second coil 132 for frequency tuning. Alternatively, in the case where the second coil 132 does not include the capacitor, the opposite ends of the second coil 132 may be directly connected to each other. Similar to the second coil 132, the first coil 131 may further include a capacitor. An equivalent circuit of the antenna 130 will be described below.

Figure 4:
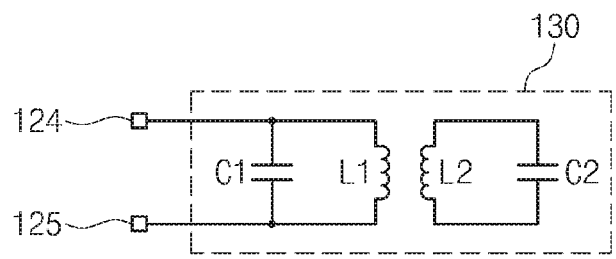
FIG. 4 is a view illustrating an equivalent circuit of the antenna according to an exemplary embodiment.

FIG. 4 is a view illustrating an equivalent circuit of an antenna according to an exemplary embodiment. FIG. 4 will be described with reference to FIGS. 2 and 3. Referring to FIG. 4, the antenna 130 is expressed by an equivalent circuit that includes a first inductor L1, a second inductor L2, a first capacitor C1, and/or a second capacitor C2. The first inductor L1 may be an inductance component of the first coil 131. The first capacitor C1 may be a capacitance component of the first coil 131. The second inductor L2 may be an inductance component of the second coil 132. The second capacitor C2 may be a capacitance component of the second coil 132.

The first inductor L1 and the first capacitor C1 may constitute a parallel resonator. The second inductor L2 and the second capacitor C2 may constitute a parallel resonator. Each of the first and second inductors L1 and L2 may be determined according to a form, a thickness, or an arrangement space thereof. The first capacitor C1 and/or second capacitor C2 may be a parasitic capacitor or a lumped element. In the case where the first capacitor C1 is a lumped element, the first coil 131 may further include a capacitor connected to opposite ends thereof. In the case where the second capacitor C2 is a lumped element, the second coil 132 may further include a capacitor connected to opposite ends thereof.

The first capacitor C1 and the first inductor L1 may be connected in series with each other, and the second capacitor C2 and the second inductor L2 may be connected in series with each other. The first coil 131 and/or the second coil 132 may further include a resistor.

In the case where the electronic device 100 transmits NFC signals, a magnetic field may be formed around the first inductor L1 due to a current flowing through the first inductor L1. An induced current may flow through the second inductor L2 by the formed magnetic field. That is, the second inductor L2 may be supplied with electric power from the first inductor L1 by magnetic induction. The second inductor L2 and the second capacitor C2 may resonate at a center frequency (e.g., 13.56 MHz) of frequencies in a band occupied by an NFC signal by the above-described electric power.

In the case where the electronic device 100 receives the NFC signals, the parallel resonator that is composed of the second inductor L2 and the second capacitor C2 may resonate by an NFC signal transmitted from an external device. The first inductor L1 may be supplied with electric power from the second inductor L2 by the magnetic induction. The first inductor L1 and the first capacitor C1 may resonate by the above-described electric power. The NFC signals may be transferred to the application processor 111 through the matching circuit 113 and the NFC transceiver 112.

As illustrated in FIG. 4, the first inductor L1 and the second inductor L2 may be separated and arranged to transmit and receive the NFC signals. Since the first inductor L1 and the second inductor L2 are separated from each other, the inductive coupling may be generated between the first inductor L1 and the second inductor L2. Since the first inductor L1 and the second inductor L2 are separated from each other, the electronic device 100 may improve transmission and reception performance (the quality factor; Q value) of the NFC signals. The antenna 130 may include only the first coil 131 (refer to FIGS. 2 and 3). The antenna 130 may include the second coil 132 (refer to FIGS. 2 and 3) in addition to the first coil 131. That is, the antenna 130 may further include the second coil 132 to improve the transmission and reception performance of the antenna 130.

A size of the antenna (or an area where the antenna is formed) may be changed according to the use or purpose. For example, the size of an antenna that is used in a mobile point of sale (mPOS) for the credit card payment may be different from the size of an antenna that is used in a P2P for data communication.

The electronic device 100 according to an exemplary embodiment may include the antenna 130 that is arranged in the interior of the accessory 120. That is, the first coil 131 and the second coil 132 may be arranged in the interior of the accessory 120. As such, the degree of freedom in placement of the antenna 130 may be improved. The electronic device 100 according to an exemplary embodiment may support the P2P mode, the reader mode, and the card emulation mode of the NFC by arranging the antenna 130 in the accessory 120.

Figure 5:
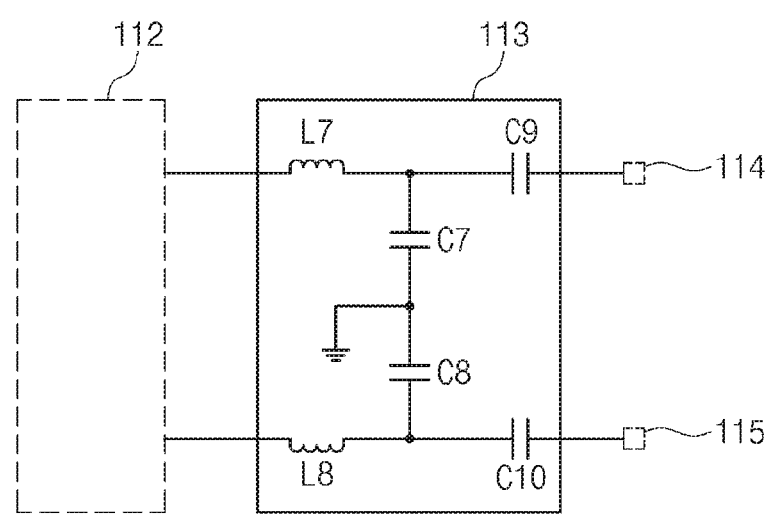
FIG. 5 is a view illustrating a matching circuit according to an exemplary embodiment.

FIG. 5 is a view illustrating a matching circuit according to an exemplary embodiment. Referring to FIG. 5, the matching circuit 113 may include inductors L7 and L8 and capacitors C7, C8, C9, and C10. The inductors L7 and L8 and the capacitors C7 and C8 may constitute an EMC filter. The EMC filter may lower a 13.56 MHz frequency harmonic component of the NFC signals. The sizes of the inductors L7 and L8 and the capacitors C7 and C8 may be determined in consideration of the harmonic component.

The capacitors C9 and C10, i.e., matching capacitors, may be used for impedance matching. The sizes of the capacitors C9 and C10 may be determined in consideration of loads of the NFC transceiver 112, the terminals 114, 115, 124, and 125, and/or the antenna 130. The sizes of the capacitors C7 and C8 and the inductors L7 and L8 may be determined in consideration of loads of the capacitors C9 and C10 and the NFC transceiver 112.

Figure 6:
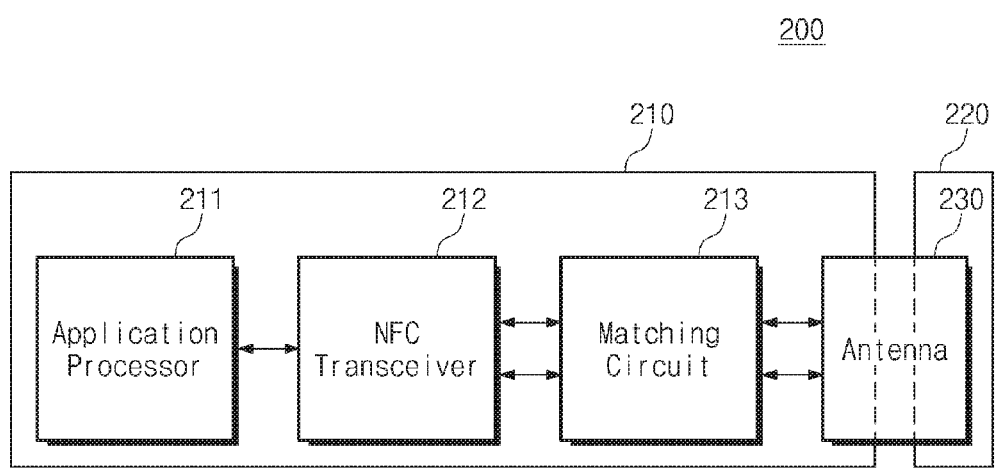
FIG. 6 is a block diagram illustrating an electronic device according to an exemplary embodiment.

FIG. 6 is a block diagram illustrating an electronic device according to an exemplary embodiment. FIG. 6 will be described with reference to FIG. 1. Referring to FIG. 6, an electronic device 200 may include a mobile device 210 or an accessory 220. The mobile device 210 and the accessory 220 of the electronic device 200 may perform the same functions of the mobile device 110 and the accessory 120 of the electronic device 100 described above.

Referring to FIG. 6, the mobile device 210 may include an application processor 211, an NFC transceiver 212, and a matching circuit 213. The application processor 211, the NFC transceiver 212, and the matching circuit 213 of the electronic device 210 perform the same functions as the application processor 111, the NFC transceiver 112, and the matching circuit 113 of the electronic device 110, and a description thereof will not be repeated here. The antenna 230 of FIG. 6 may be arranged in the mobile device 210 and the accessory 220. For example, the antenna 230 may be composed of a plurality of coils. Some of the coils of the antenna 230 may be arranged in the mobile device 210, and the remaining coils of the antenna 230 may be arranged in the accessory 220.

Figure 7:
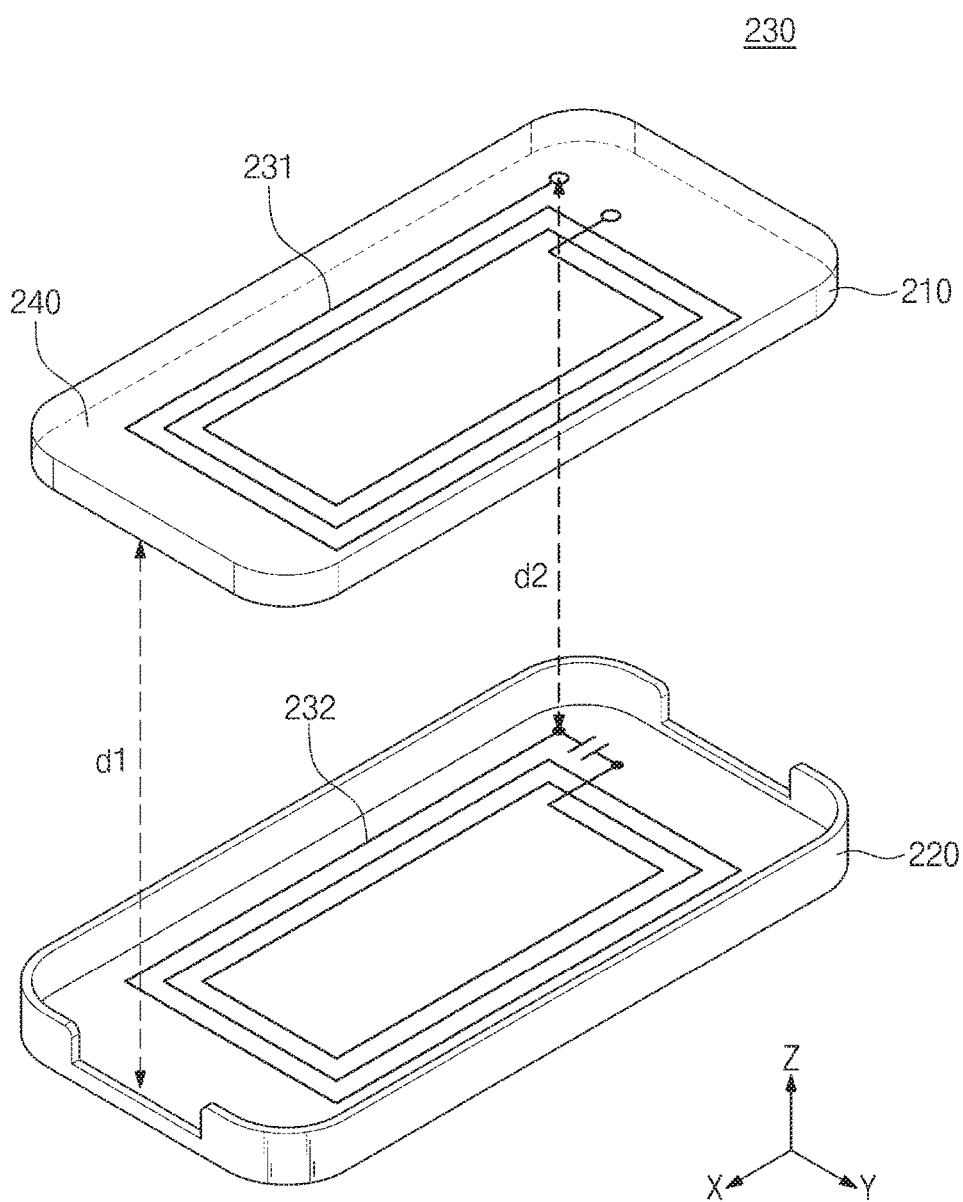
FIG. 7 is a view illustrating an antenna according to an exemplary embodiment.
Figure 8:
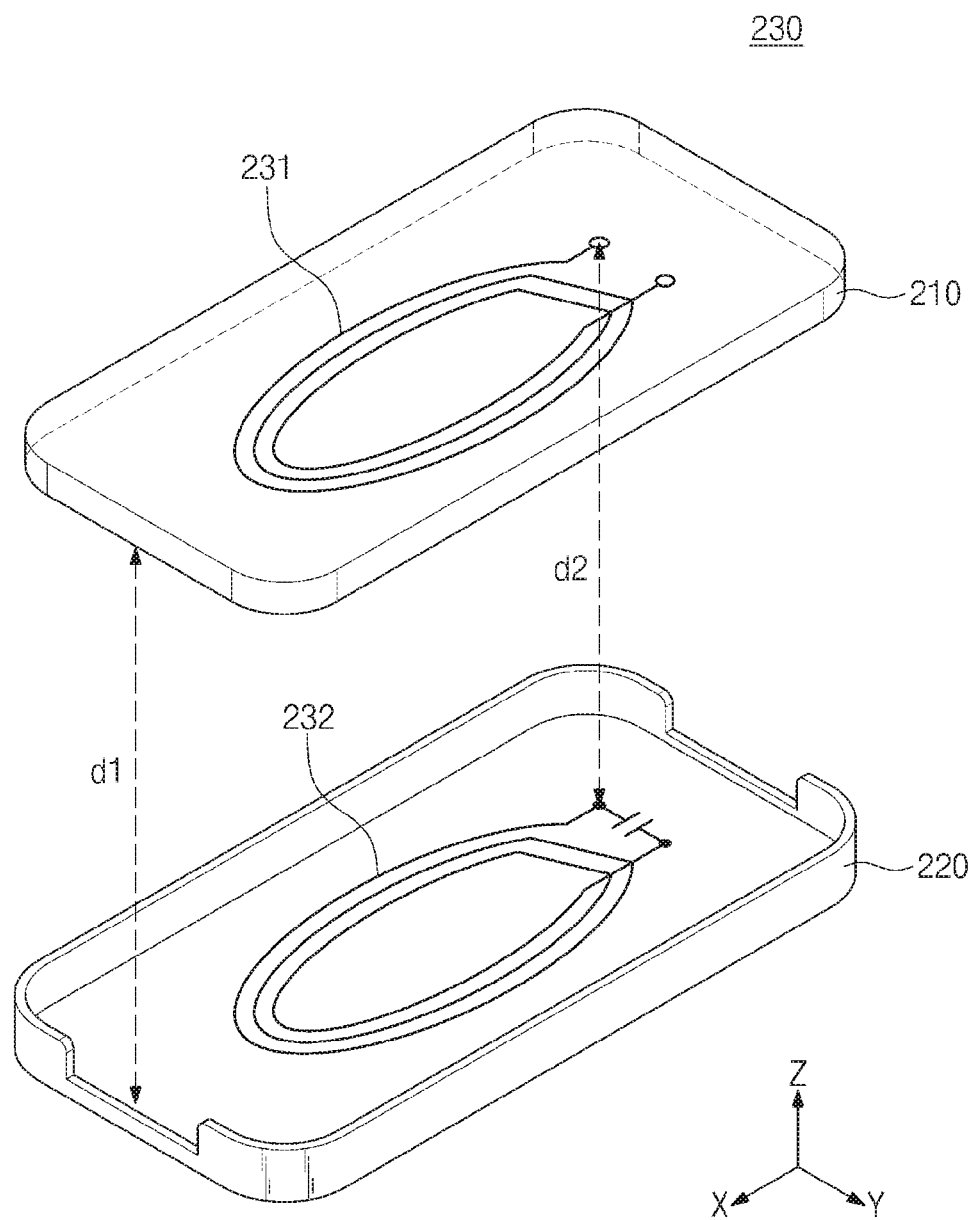
FIG. 8 is a view illustrating an antenna according to an exemplary embodiment.

FIGS. 7 to 13 are views illustrating an antenna illustrated in FIG. 6. Referring to FIGS. 7 and 8, the antenna 230 may include a first coil 231 and a second coil 232. The first coil 231 may be arranged in or on a case 240 in which the mobile device 210 is housed. The second coil 232 may be arranged in the accessory 220 disposed externally to the case 240. The first coil 231 and the second coil 232 may be arranged to be separated from each other. Referring to FIG. 7, each of the first coil 231 and the second coil 232 may be implemented in a rectangular spiral form. Referring to FIG. 8, each of the first coil 231 and the second coil 232 may be implemented in a helical form. The number of turns, a width, a length, a location, and a thickness of each of the first coil 231 and the second coil 232 are not limited to FIGS. 7 and 8. Also, referring to FIGS. 7 to 13, an area where the first and second coils 231 and 232 are overlapped with each other exists, and an area where a third coil 233 and the second coil 232 are overlapped with each other exists. The overlapped area may be isolated by an insulating material. For example, a coil may be arranged in a plurality of layers through a via, and insulating materials may be arranged among the layers. Referring to FIGS. 7 and 8, a capacitor may be connected to opposite ends of the second coil 232. The capacitor may be connected to the second coil 232 for frequency tuning. Alternatively, in the case where the second coil 232 does not include the capacitor, the opposite ends of the second coil 232 may be directly connected to each other. Similar to the second coil 232, the first coil 231 may further include a capacitor.

Figure 9:
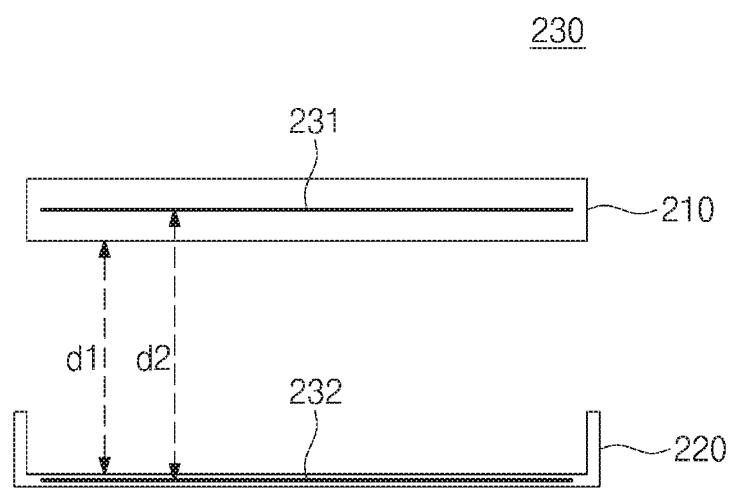
FIG. 9 is a view illustrating an antenna according to an exemplary embodiment.

Referring to FIGS. 7 and 8, a distance between facing surfaces of the mobile device 210 and the accessory 220 may be d1. A distance between the first coil 231 and the second coil 232 may be d2. FIG. 9 is a view that illustrates the distance d1 between the mobile device 210 and the accessory 220 and the distance d2 between the first coil 231 and the second coil 232. The distances d1 and d2 may be set to be suitable for causing the inductive coupling between an inductor of the first coil 231 and an inductor of the second coil 232. For example, distance d1 may be not more than 5 mm. For example, distance d2 may be not more than 10 mm. Alternatively, the distance "d2" may be approximately 10 mm.

The first coil 231 and the second coil 232 perform the same functions of the first coil 131 and the second coil 132 except arrangement locations of the first and second coils 231 and 232 are different from those of the first and second coils 131 and 132, and a description thereof will not be repeated here.

Figure 10:
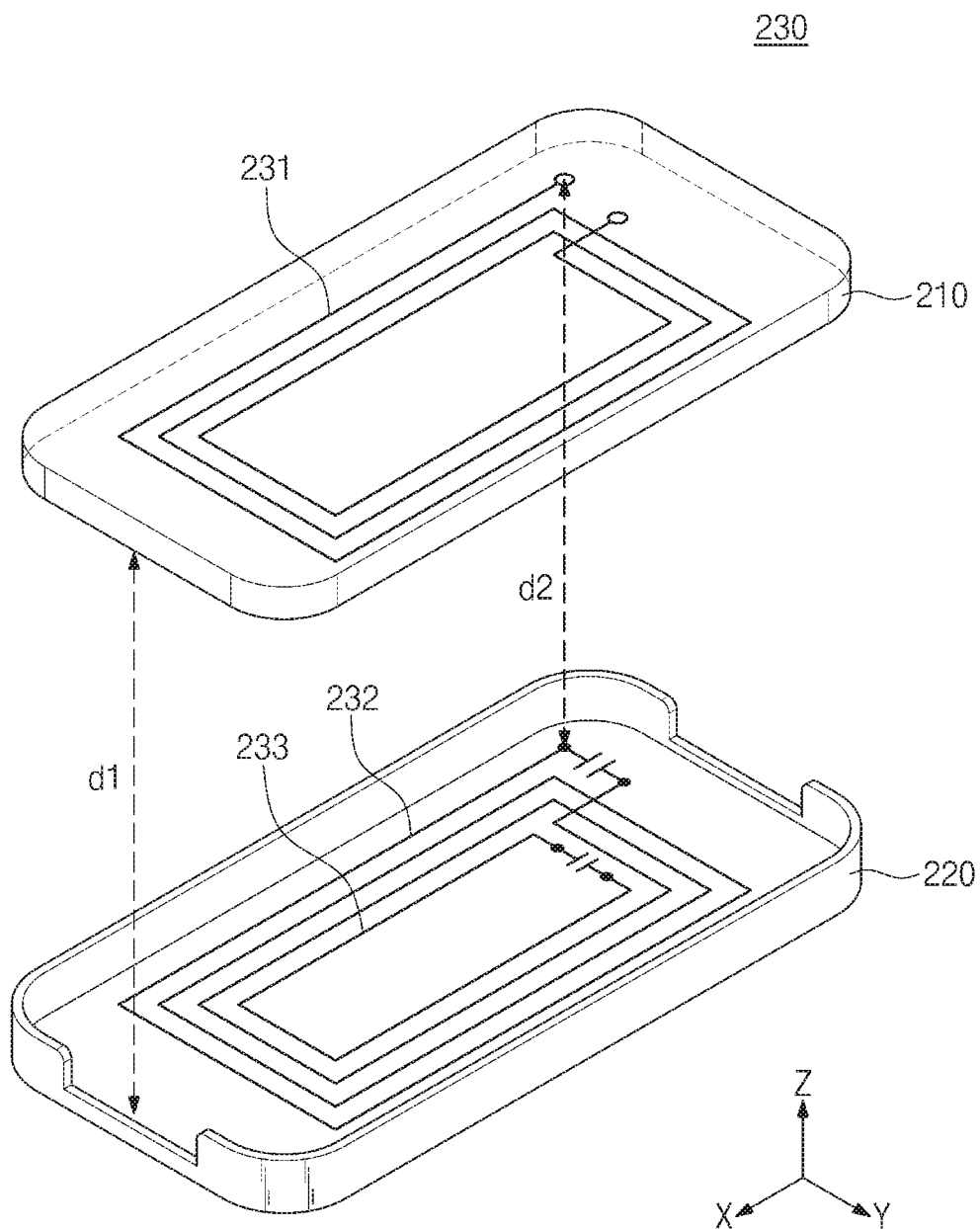
FIG. 10 is a view illustrating an antenna according to an exemplary embodiment.
Figure 11:
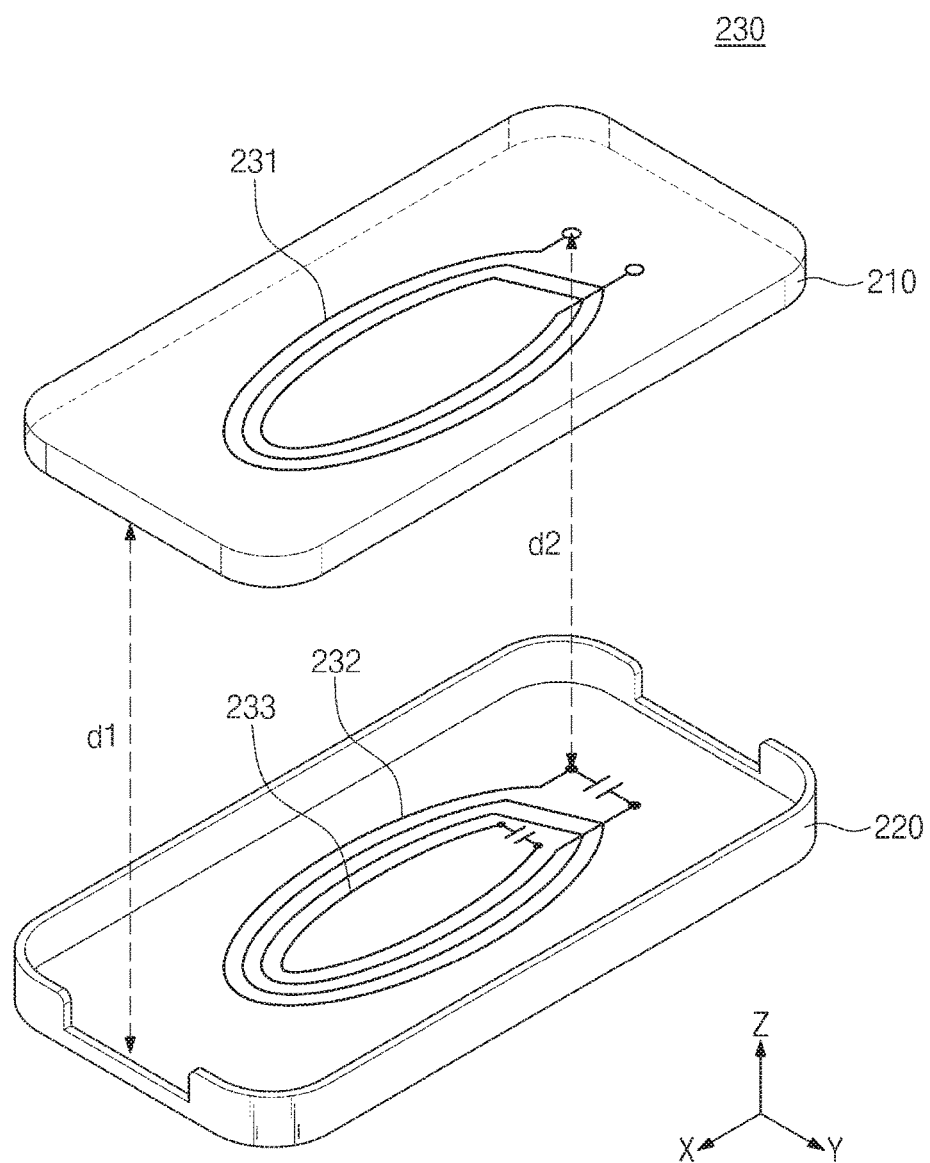
FIG. 11 is a view illustrating an antenna according to an exemplary embodiment.

Referring to FIGS. 10 and 11, the antenna 230 may include the first coil 231, the second coil 232, and the third coil 233. The first coil 231 may be arranged in the mobile device 210. The second coil 232 and the third coil 233 may be arranged in the accessory 220. The antenna 230 of FIGS. 10 and 11 may further include the third coil 233 separated from the second coil 232, to improve the transmission and reception performance of the NFC signals. Like inductors of the first and second coils 231 and 232, the magnetic induction may be generated at an inductor of the third coil 233. Referring to FIG. 10, the third coil 233 may be implemented in a rectangular spiral form. Referring to FIG. 11, the third coil 233 may be implemented in a helical form. The number of turns, a width, a length, a location, and a thickness of the third coil 233 are not limited to FIGS. 10 and 11.

Referring to FIGS. 10 and 11, a capacitor may be connected to opposite ends of the third coil 233. The capacitor may be connected to the third coil 233 for frequency tuning. Alternatively, in the case where the third coil 233 does not include the capacitor, the opposite ends of the third coil 233 may be directly connected to each other. The first coil 231 and the second coil 232 perform the same functions of the first coil 131 and the second coil 132 except arrangement locations of the first and second coils 231 and 232 are different from those of the first and second coils 131 and 132, and a description thereof will not be repeated here. The third coil 233 and the second coil 232 may be arranged to be separated from each other. The third coil 233 performs the same function of the second coil 232 except an arrangement location of the third coil 233 is different from that of the second coil 232, and a description thereof will not be repeated here.

Referring to FIGS. 10 and 11, a distance between the mobile device 210 and the accessory 220 may be d1. A distance between the first coil 231 and the second coil 232 may be d2. Distances d1 and d2 may be set to be suitable for causing the inductive coupling between an inductor of the first coil 231 and an inductor of the second coil 232. For example, distance d1 may be not more than 5 mm. For example, distance d2 may be not more than 10 mm.

Figure 12:
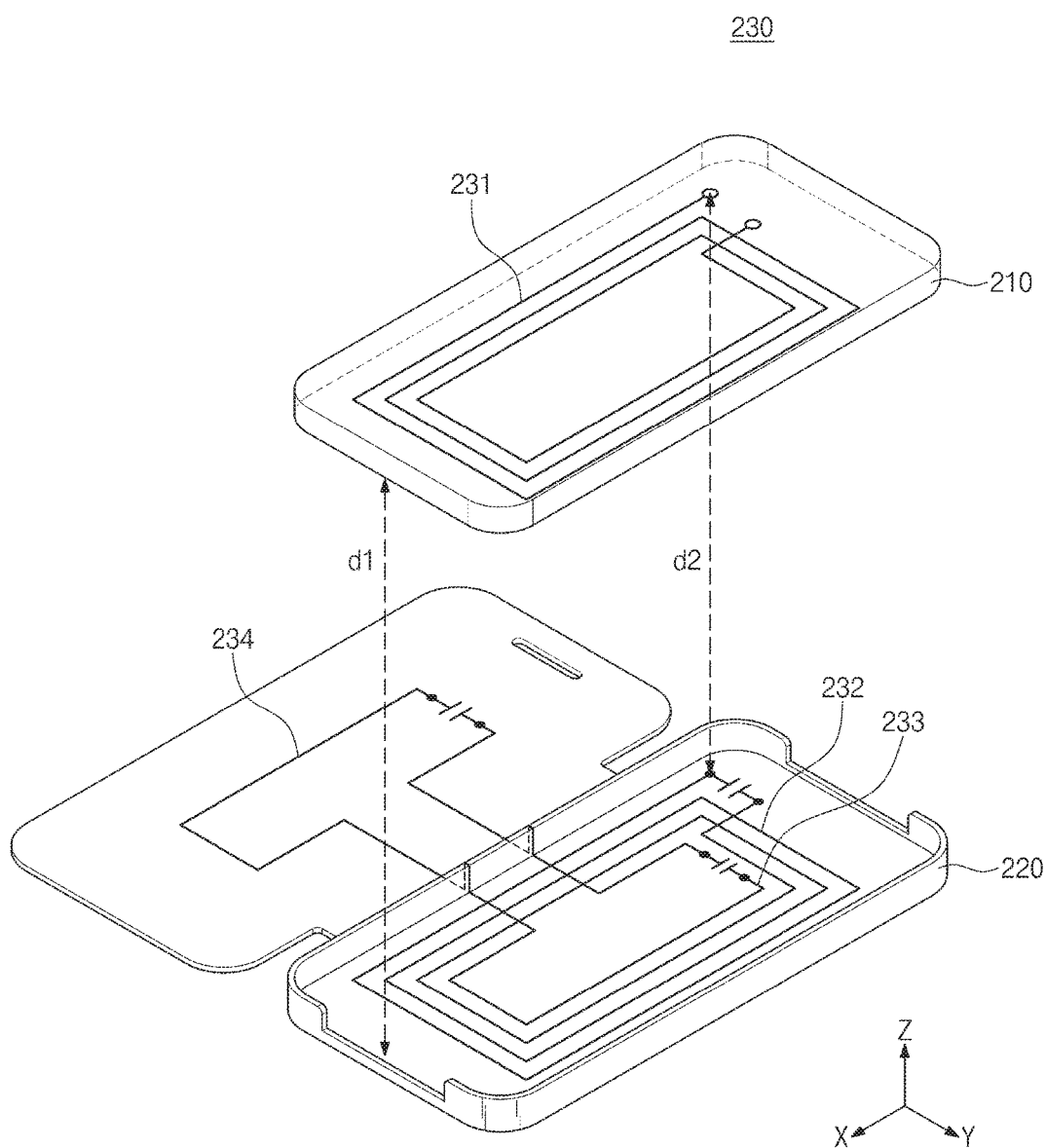
FIG. 12 is a view illustrating an antenna according to an exemplary embodiment.
Figure 13:
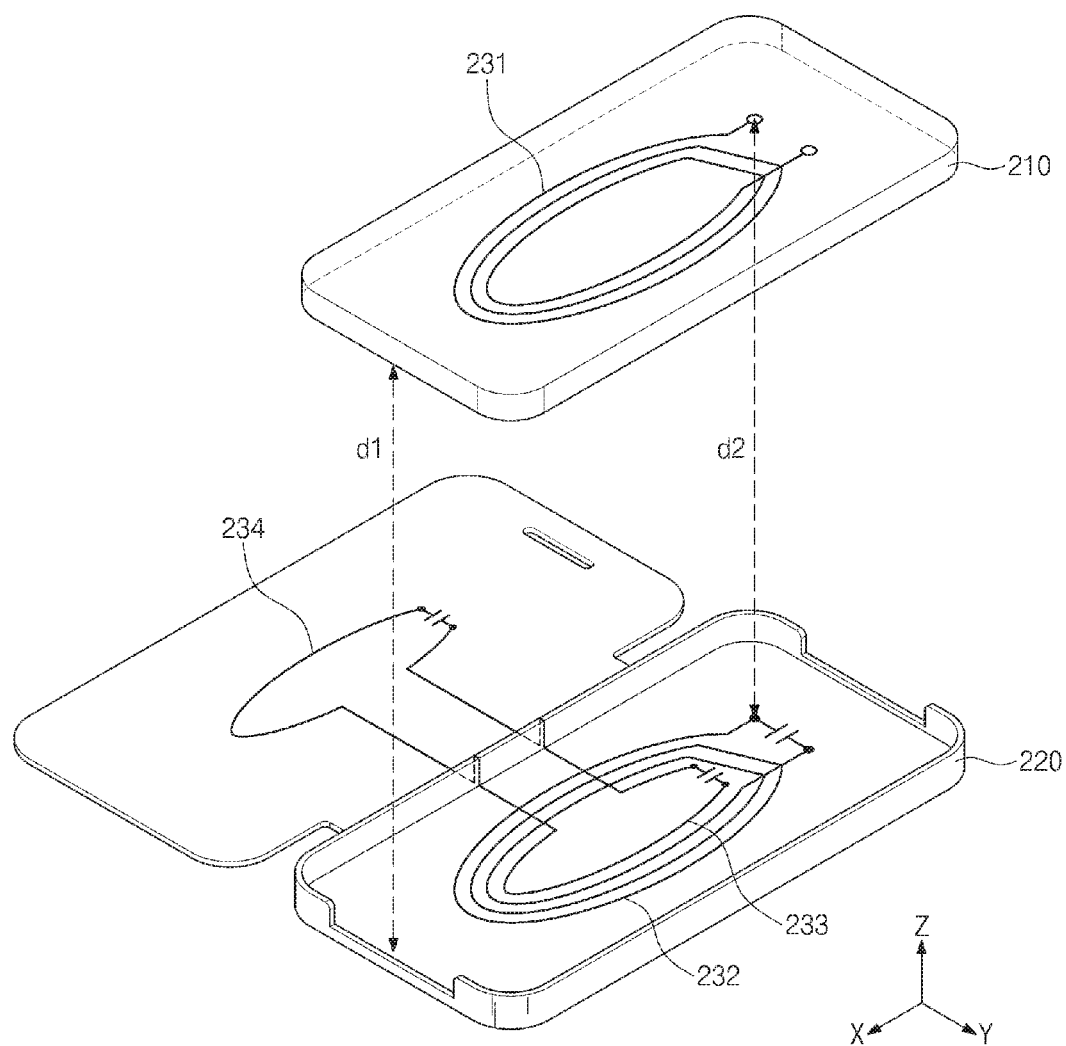
FIG. 13 is a view illustrating an antenna according to an exemplary embodiment.

Referring to FIGS. 12 and 13, the antenna 230 may include the first coil 231, the second coil 232, the third coil 233, and a fourth coil 234. The first coil 231 may be arranged in the mobile device 210. The second coil 232, the third coil 233, and the fourth coil 234 may be arranged in the accessory 220. In this case, the accessory 220 may be a flip cover of the mobile device 210. The antenna 230 of FIGS. 11 and 12 may further include the fourth coil 234 connected with the third coil 233, to improve the transmission and reception performance of the NFC signals. Alternatively, the fourth coil 234 may not be connected with the third coil 233. In the case where the flip cover is closed, the magnetic induction may be generated at an inductor of the forth coil 234 like inductors of the first to third coils 231 to 233. Referring to FIG. 12, the fourth coil 234 may be implemented in a rectangular spiral form. Referring to FIG. 13, the fourth coil 234 may be implemented in a helical form. The number of turns, a width, a length, a location, and a thickness of the fourth coil 234 are not limited to FIGS. 12 and 13.

Referring to FIGS. 12 and 13, a capacitor may be connected to opposite ends of the fourth coil 234. The capacitor may be connected to the forth coil 234 for frequency tuning. Alternatively, in the case where the fourth coil 234 does not include the capacitor, the opposite ends of the fourth coil 234 may be directly connected to each other.

The first coil 231, the second coil 232, and the third coil 233 perform the same functions of the first coil 231, the second coil 232, and the third coil 233 which are described in FIGS. 10 and 11, and a description thereof will not be repeated here. The second coil 232 and third coil 233 may be arranged on a rear surface of a flip cover. The fourth coil 234 may be arranged on a front surface of the flip cover while being connected with the third coil 233. The fourth coil 234 performs the same function of the third coil 233 except an arrangement location of the fourth coil 234 is different from that of the third coil 233, and a description thereof will not be repeated here.

The second coil 232, the third coil 233, and the fourth coil 234 all may be arranged in any combination on the front surface or the rear surface of the flip cover. For example, the second coil 232 and the third coil 233 may be arranged on the front surface of the flip cover, and the fourth coil 234 may be arranged on the rear surface of the flip cover.

Referring to FIGS. 12 and 13, a distance between the mobile device 210 and the accessory 220 may be d1. A distance between the first coil 231 and the second coil 232 may be d2. Distances d1 and d2 may be set to be suitable for causing the inductive coupling between an inductor of the first coil 231 and an inductor of the second coil 232. For example, distance d1 may be not more than 5 mm. For example, distance d2 may be not more than 10 mm.

Referring to FIGS. 7 to 13, the mobile device 210 may be a mobile phone, a smartphone, a tablet PC, a notebook computer, a digital camera, a smart ring, a smart watch, etc.

The accessory 220 may be attached to all or a part of the mobile device 210. The accessory 220 may be detached from and attached to the mobile device 210. For example, the accessory 220 may be formed of leather, urethane, metal, etc. For example, the accessory 220 may be a film that is completely attached on one surface of the mobile device 210. For example, the accessory 220 may be a cover, a sticker, an antiskid pad, a film, an auxiliary battery, a smart grip, etc. However, the accessory 220 is not limited thereto. For example, the accessory 220 may be manufactured in various forms to protect the mobile device 210. The accessory 220 may be manufactured in various forms to improve the aesthetic sense of the mobile device 210.

Referring to FIGS. 7 to 13, the coils 231, 232, 233, and 234 may be arranged at the center area of the mobile device 210 or the accessory 220 and may be implemented in a rectangular spiral form or a helical form. However, embodiments are not limited thereto. That is, the coils 231, 232, 233, and 234 may be arranged using the entire space of the mobile device 210 or the accessory 220. The coils 231, 232, 233, and 234 may be implemented in all forms forming a loop in the above-described space.

Figure 14:
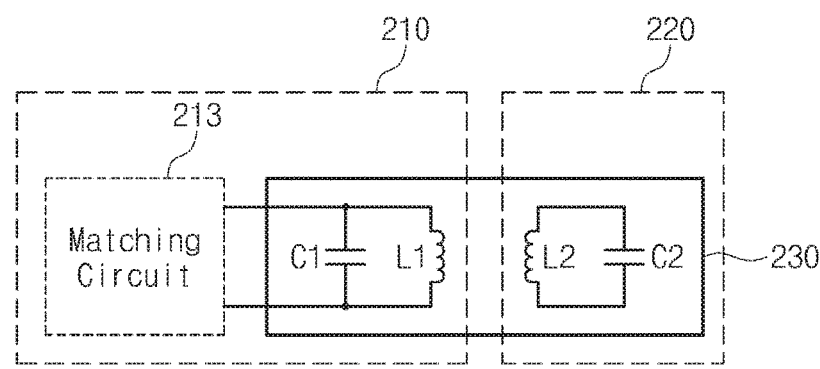
FIG. 14 is a view illustrating an equivalent circuit of an antenna according to an exemplary embodiment, illustrated in FIGS. 7 and 8.

FIG. 14 is a view illustrating an equivalent circuit of an antenna according to an exemplary embodiment, illustrated in FIGS. 7 and 8. FIG. 14 will be described with reference to FIGS. 7 and 8. Referring to FIG. 14, the antenna 230 is expressed by an equivalent circuit that includes a first inductor L1, a second inductor L2, a first capacitor C1, and/or a second capacitor C2. The first inductor L1 may be an inductance component of the first coil 231. The first capacitor C1 may be a capacitance component of the first coil 231. The second inductor L2 may be an inductance component of the second coil 232. The second capacitor C2 may be a capacitance component of the second coil 232.

The first inductor L1 and the first capacitor C1 may constitute a parallel resonator. The second inductor L2 and the second capacitor C2 may constitute a parallel resonator. Each of the first and second inductors L1 and L2 may be determined according to a form, a thickness, or an arrangement space thereof. The first and/or second capacitors C1 and C2 may be a parasitic capacitor or a lumped element. In the case where each of the first and second capacitors C1 and C2 is a lumped element, each of the first coil 231 and the second coil 232 may include a capacitor electrically connected therein.

The first capacitor C1 and the first inductor L1 may be connected in series with each other, and the second capacitor C2 and the second inductor L2 may be connected in series with each other. At least one among the first coil 231 and the second coil 232 may further include a resistor.

In the case where the electronic device 200 transmits NFC signals, a magnetic field may be formed around the first inductor L1 due to a current flowing through the first inductor L1. An induced current may flow through the second inductor L2 by the formed magnetic field. That is, the second inductor L2 may be supplied with electric power from the first inductor L1 by magnetic induction. The second inductor L2 and the second capacitor C2 may resonate at a center frequency (e.g., 13.56 MHz) of frequencies in a band occupied by an NFC signal by the above-described electric power.

In the case where the electronic device 200 receives the NFC signals, the parallel resonator that is composed of the second inductor L2 and the second capacitor C2 may resonate by an NFC signal transmitted from an external device. The first inductor L1 may be supplied with electric power from the second inductor L2 by the magnetic induction. The first inductor L1 and the first capacitor C1 may resonate by the above-described electric power. The NFC signals may be transferred to the application processor 211 through the matching circuit 213 and the NFC transceiver 212.

As illustrated in FIG. 14, the first inductor L1 and the second inductor L2 may be separated and arranged to transmit and receive the NFC signals. Since the first inductor L1 and the second inductor L2 are separated from each other, the inductive coupling may be generated between the first inductor L1 and the second inductor L2. Since the first inductor L1 and the second inductor L2 are separated from each other, the electronic device 200 may improve the transmission and reception performance of the NFC signals. The antenna 230 may include only the first coil 231 (refer to FIGS. 7 and 8). The antenna 230 may include the second coil 232 (refer to FIGS. 7 and 8) in addition to the first coil 231. The transmission and reception performance of the antenna 230 may be improved through the inductive coupling between the first coil 231 and the second coil 232.

Figure 15:
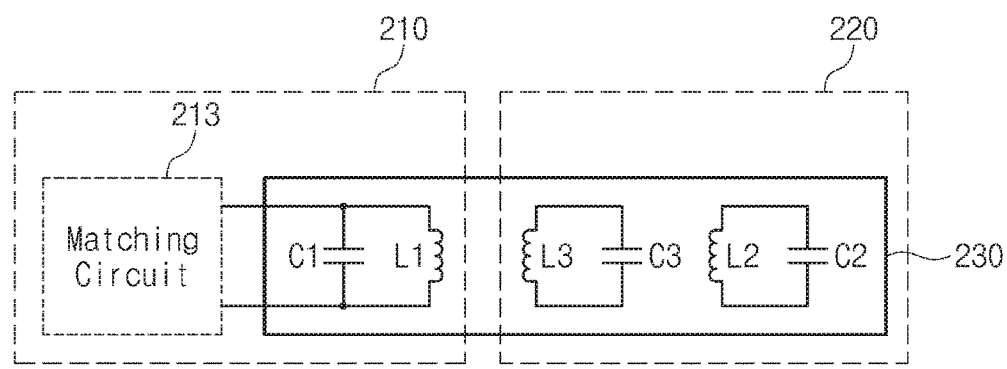
FIG. 15 is a view illustrating an equivalent circuit of an antenna according to an exemplary embodiment, illustrated in FIGS. 10 and 11.

FIG. 15 is a view illustrating an equivalent circuit of an antenna according to an exemplary embodiment, illustrated in FIGS. 10 and 11. FIG. 15 will be described with reference to FIGS. 10 and 11. Referring to FIG. 15, the antenna 230 is expressed by an equivalent circuit that includes the first inductor L1, the second inductor L2, a third inductor L3, the first capacitor C1, the second capacitor C2, and/or a third capacitor C3. The first inductor L1, the second inductor L2, the first capacitor C1, and the second capacitor C2 perform the same functions as described with reference to FIG. 14, and a description thereof will not be repeated here.

Referring to FIG. 15, the third inductor L3 may be an inductance component of the third coil 233 (refer to FIGS. 10 and 11). The third capacitor C3 may be a capacitance component of the third coil 233 (refer to FIGS. 10 and 11). The third inductor L3 and the third capacitor C3 may constitute a parallel resonator. In the case where the third capacitor C3 is a lumped element, the antenna 230 may further include a capacitor connected to the third coil 233. In FIG. 15, the third inductor L3 and the third capacitor C3 may be connected in series with each other, and the third coil 233 may further include a resistor.

In the case where the electronic device 200 transmits NFC signals, a magnetic field may be formed around the first inductor L1 due to a current flowing through the first inductor L1. An induced current may flow through the second inductor L2 and the third inductor L3 by the formed magnetic field. That is, the second inductor L2 and the third inductor L3 may be supplied with electric power from the first inductor L1 by magnetic induction. The second inductor L2 and the second capacitor C2 may resonate at a center frequency (e.g., 13.56 MHz) of frequencies in a band occupied by an NFC signal by the above-described electric power. The third inductor L3 and the third capacitor C3 may resonate at a center frequency (e.g., 13.56 MHz) of frequencies in a band occupied by an NFC signal by the above-described electric power.

In the case where the electronic device 200 receives the NFC signals, the parallel resonator that is composed of the second inductor L2 and the second capacitor C2 may resonate by an NFC signal transmitted from an external device. In the case where the electronic device 200 receives the NFC signals, the parallel resonator that is composed of the third inductor L3 and the third capacitor C3 may resonate by an NFC signal transmitted from an external device. The first inductor L1 may be supplied with electric power from the second inductor L2 and the third inductor L3 by the magnetic induction. The first inductor L1 and the first capacitor C1 may resonate by the above-described electric power. The NFC signals may be transferred to the application processor 211 through the matching circuit 213 and the NFC transceiver 212.

As illustrated in FIG. 15, the first inductor L1, the second inductor L2, and the third inductor L3 may be separated and arranged to transmit and receive the NFC signals. Since the first inductor L1, the second inductor L2, and the third inductor L3 are separated from each other, the electronic device 200 may improve the transmission and reception performance of the NFC signals. In FIG. 15, the antenna 230 may include only the first coil 231 (refer to FIGS. 10 and 11). The antenna 230 may include the second and third coil 232 and 233 (refer to FIGS. 10 and 11) in addition to the first coil 231. That is, the antenna 230 may further include the second and third coils 232 and 233 (refer to FIGS. 10 and 11) to improve the transmission and reception performance of the antenna 230.

Figure 16:
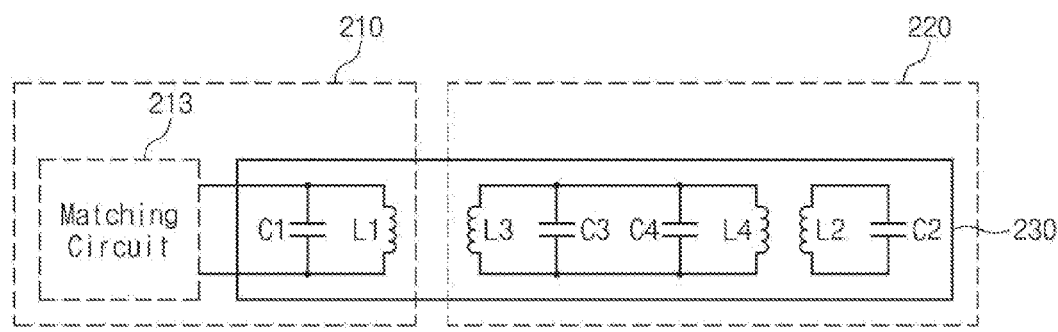
FIG. 16 is a view illustrating an equivalent circuit of an antenna according to an exemplary embodiment, illustrated in FIGS. 12 and 13.

FIG. 16 is a view illustrating an equivalent circuit of an antenna according to an exemplary embodiment, illustrated in FIGS. 12 and 13. FIG. 16 will be described with reference to FIGS. 12 and 13. Referring to FIG. 16, an equivalent circuit of the antenna 230 may include the first inductor L1, the second inductor L2, the third inductor L3, a fourth inductor L4, the first capacitor C1, the second capacitor C2, the third capacitor C3, and/or a fourth capacitor C4. The first inductor L1, the second inductor L2, the first capacitor C1, and the second capacitor C2 perform the same functions as described with reference to FIG. 14, and a description thereof will not be repeated here. The third inductor L3 and the third capacitor C3 perform the same functions as described with reference to FIG. 15, and a description thereof will not be repeated here.

Referring to FIG. 16, the fourth inductor L4 may be an inductance component of the fourth coil 234 (refer to FIGS. 12 and 13). The fourth capacitor C4 may be a capacitance component of the fourth coil 234 (refer to FIGS. 12 and 13). The fourth inductor L4 and the fourth capacitor C4 may constitute a parallel resonator. In the case where the fourth capacitor C4 is a lumped element, the antenna 230 may further include a capacitor connected to the fourth coil 234 (refer to FIGS. 12 and 13). In FIG. 16, the fourth inductor L4 and the fourth capacitor C4 may be connected in series with each other. In FIG. 16, the fourth coil 234 (refer to FIGS. 12 and 13) may further include a resistor.

In the case where the electronic device 200 transmits NFC signals, a magnetic field may be formed around the first inductor L1 due to a current flowing through the first inductor L1. An induced current may flow through the second inductor L2, the third inductor L3, and the fourth inductor L4 by the formed magnetic field. That is, the second inductor L2, the third inductor L3, and the fourth inductor L4 may be supplied with electric power from the first inductor L1 by magnetic induction. The second inductor L2 and the second capacitor C2 may resonate at a center frequency (e.g., 13.56 MHz) of frequencies in a band occupied by an NFC signal by the above-described electric power. The third inductor L3 and the third capacitor C3 may resonate at a center frequency (e.g., 13.56 MHz) of frequencies in a band occupied by an NFC signal by the above-described electric power. The fourth inductor L4 and the fourth capacitor C4 may resonate at a center frequency (e.g., 13.56 MHz) of frequencies in a band occupied by an NFC signal by the above-described electric power.

In the case where the electronic device 200 receives the NFC signals, the parallel resonator that is composed of the second inductor L2 and the second capacitor C2 may resonate by an NFC signal transmitted from an external device. In the case where the electronic device 200 receives the NFC signals, the parallel resonator that is composed of the third inductor L3 and the third capacitor C3 may resonate by an NFC signal transmitted from an external device. In the case where the electronic device 200 receives the NFC signals, the parallel resonator that is composed of the fourth inductor L4 and the fourth capacitor C4 may resonate by an NFC signal transmitted from an external device. The first inductor L1 may be supplied with electric power from the second inductor L2, the third inductor L3, and the fourth inductor L4 by the magnetic induction. The first inductor L1 and the first capacitor C1 may resonate by the above-described electric power. The NFC signals may be transferred to the application processor 211 through the matching circuit 213 and the NFC transceiver 212.

As illustrated in FIG. 16, the first inductor L1, the second inductor L2, the third inductor L3, and the fourth inductor L4 may be separated and arranged to transmit and receive the NFC signals. Since the first inductor L1, the second inductor L2, the third inductor L3, and the fourth inductor L4 are separated from each other, the electronic device 200 may improve the transmission and reception performance of the NFC signals. In FIG. 16, the antenna 230 may include only the first coil 231 (refer to FIGS. 12 and 13). The antenna 230 may also include the second to fourth coils 232 to 234 (refer to FIGS. 12 and 13) in addition to the first coil 231. That is, the antenna 230 may further include the second to fourth coils 232 to 234 (refer to FIGS. 12 and 13) to improve the transmission and reception performance of the antenna 230.

Some of coils constituting the antenna 230 may be arranged in the interior of the accessory 220 according to an exemplary embodiment. That is, the second coil 232, the third coil 233, and the fourth coil 234 may be arranged in the interior of the accessory 220. As such, the degree of freedom in placement of the antenna 230 may be improved. The electronic device 200 according to an exemplary embodiment may support the P2P mode, the reader mode, and the card emulation mode of the NFC by arranging a part of the antenna 230 in the accessory 220.

Referring again to FIGS. 1 and 6, unlike the electronic device 100 of FIG. 1, the electronic device 200 does not need terminals in the mobile device 210 and the accessory 220. In FIG. 1, the electronic device 100 may need the terminals 114, 115, 124, and 125 for an electrical connection between the matching circuit 113 and the antenna 130. In the electronic device 600 of FIG. 6, some of coils constituting the antenna 230 may be arranged in the mobile device 210, and the remaining coils may be arranged in the accessory 220. Since the inductive coupling is generated between the above-described coils, the electronic device does not need the above-described terminals.

Figure 17:
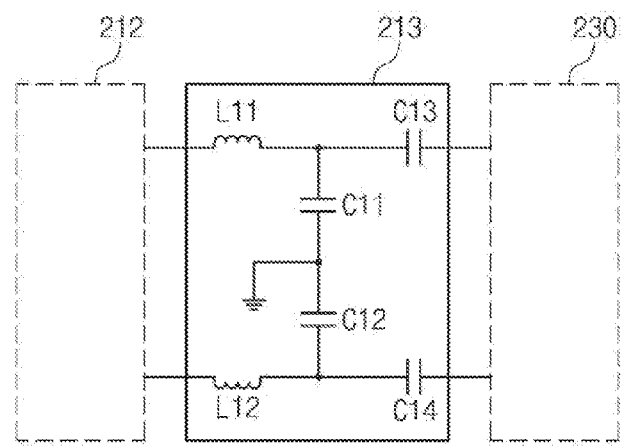
FIG. 17 is a view illustrating a matching circuit according to an exemplary embodiment.

FIG. 17 is a view illustrating a matching circuit according to an exemplary embodiment. Referring to FIG. 17, the matching circuit 213 may include inductors L11 and L12 and capacitors C11, C12, C13, and C14. The inductors L11 and L12 and the capacitors C11 to C14 of the matching circuit 213 perform the same functions as the inductors L7 and L8 and the capacitors C7 to C10 of the matching circuit 113, and a description thereof will not be repeated here.

Figure 18:
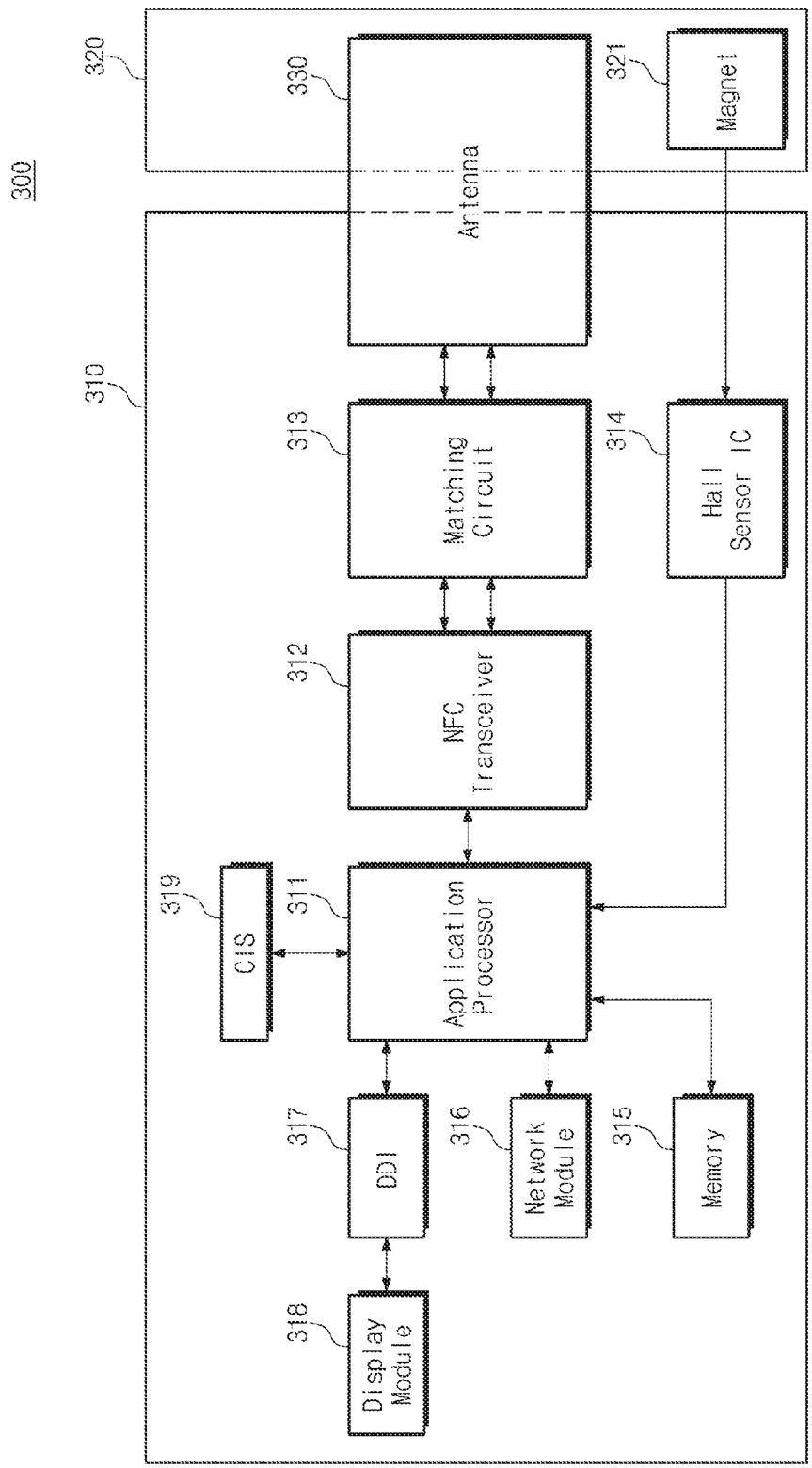
FIG. 18 is a block diagram illustrating a mobile device according to an exemplary embodiment.

FIG. 18 is a block diagram illustrating a mobile device according to an exemplary embodiment. Referring to FIG. 18, an electronic device 300 may include a mobile device 310 and an accessory 320.

The mobile device 310 may include an application processor 311, an NFC transceiver 312, a matching circuit 313, a hall sensor integrated circuit (IC) 314, a memory 315, a network module 316, a display driver integrated circuit (DDI) 317, a display module 318, and/or a CMOS image sensor (CIS) 319. The accessory 320 may include a magnet 321. The NFC transceiver 312 and the matching circuit 313 of the mobile device 310 perform the same functions of the NFC transceiver 212 and the matching circuit 213 of the mobile device 210, and a description thereof will not be repeated here. Similarly to what is described above with reference to FIG. 6, the antenna 330 may be composed of a plurality of coils. Some of the coils of the antenna 330 may be arranged in the mobile device 310, and the remaining coils of the antenna 330 may be arranged in the accessory 320.

The hall sensor IC 314 may be arranged in the mobile device 310. The hall sensor IC 314 may determine whether the accessory 320 is attached to the mobile device 310. For example, the hall sensor IC 314 may determine whether the accessory 320 is attached to the mobile device 310, through the magnet 321 attached to the accessory 320. The magnet 321 may be arranged with reference to a location of the hall sensor IC 314. The magnet 321 may attach the accessory 320 to the mobile device 310. The hall sensor IC 314 may transfer information to the application processor 311 and the above-described information may include whether the accessory 320 is attached to the mobile device 310.

In the case where the application processor 311 determines that the accessory 320 is attached, based on the above-described information, the application processor 311 may operate the NFC transceiver 312, the matching circuit 313, and the antenna 330. The application processor 311 may drive a program of the mobile device 310. For example, the application processor 311 may drive a P2P program, a card emulation program, or a reader program. The application processor 311 may provide a display part of the mobile device 310 with an interface that allows a user to control the above-described program.

In the case where the application processor 311 determines that the accessory 320 is not attached, based on the above-described information, the application processor 311 does not operate the NFC transceiver 312, the matching circuit 313, and the antenna 330. The application processor 311 does not execute a program that is executable when the accessory 320 is attached. Accordingly, the application processor 311 may prevent unnecessary power consumption.

Instructions or data that will be used by the application processor 311 may be stored in the memory 315. The memory 315 may be implemented with hardware. For example, the memory 315 may be an electrically erasable and programmable read only memory (EEPROM), a NAND flash memory, a NOR flash memory, a phase-change random access memory (PRAM), a resistive RAM (ReRAM), a ferroelectric RAM (FeRAM), a spin-torque magnetic RAM (STT-MRAM), dynamic RAM (DRAM), etc.

The network module 316 may communicate with external devices. The network module 316 may include a receiver and a transmitter. For example, the network module 316 may support wireless communications, such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless LAN (WLAN), ultra wide band (UWB), BLUETOOTH®, and wireless display (WiDi).

The display driver circuit 317 may drive the display module 318. The display driver circuit 317 may process display data transmitted from the application processor 311 and may transmit the processed display data to the display module 318. The display driver circuit 317 may be implemented with an integrated circuit. The display driver circuit 317 may be implemented in the interior of the application processor 311 or may be implemented separately at the outside.

The display module 318 may display an image. The display module 318 may be provided with display data from the display driver circuit 317. The display module 318 may include an organic light emitting display panel, a liquid crystal display panel, a plasma display panel, an electrophoretic display panel, an electrowetting display panel, etc.

The CMOS image sensor 319 may capture external image information under control of the application processor 311. The CMOS image sensor 319 may receive the external image information and may transfer the received information to the application processor 311. The application processor may store the received information in the memory 315.

Figure 19:
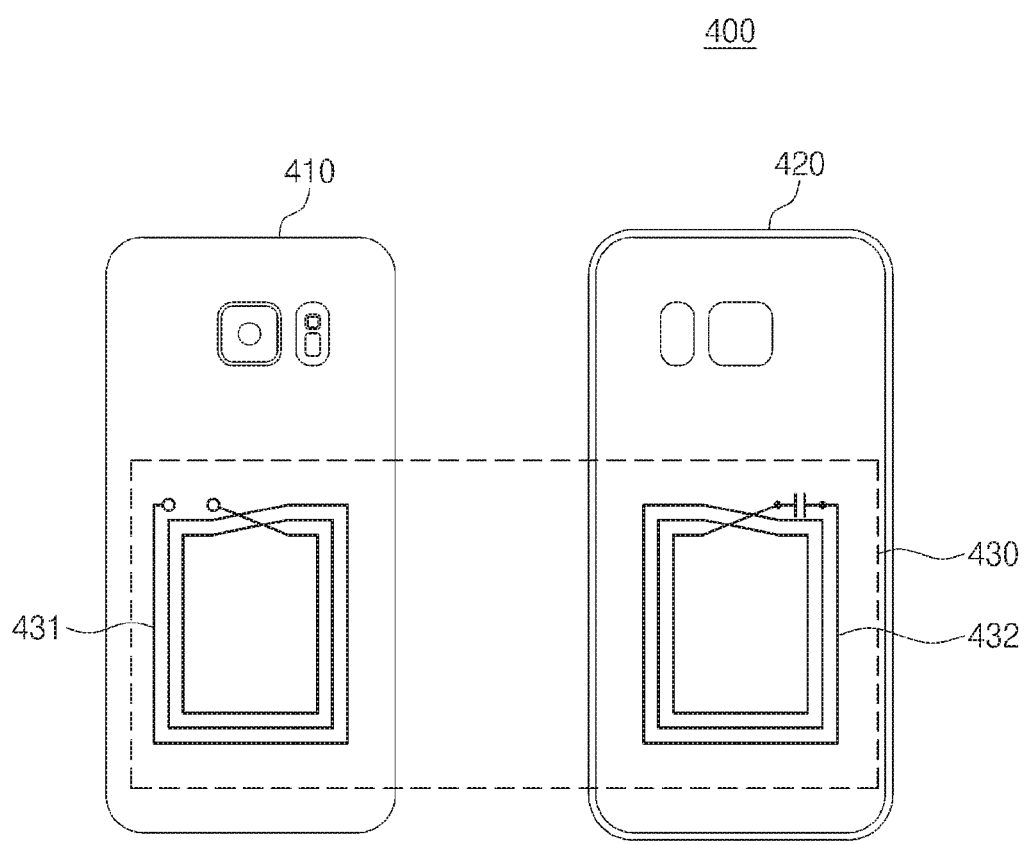
FIG. 19 is a view of an electronic device according to an exemplary embodiment.
Figure 20:
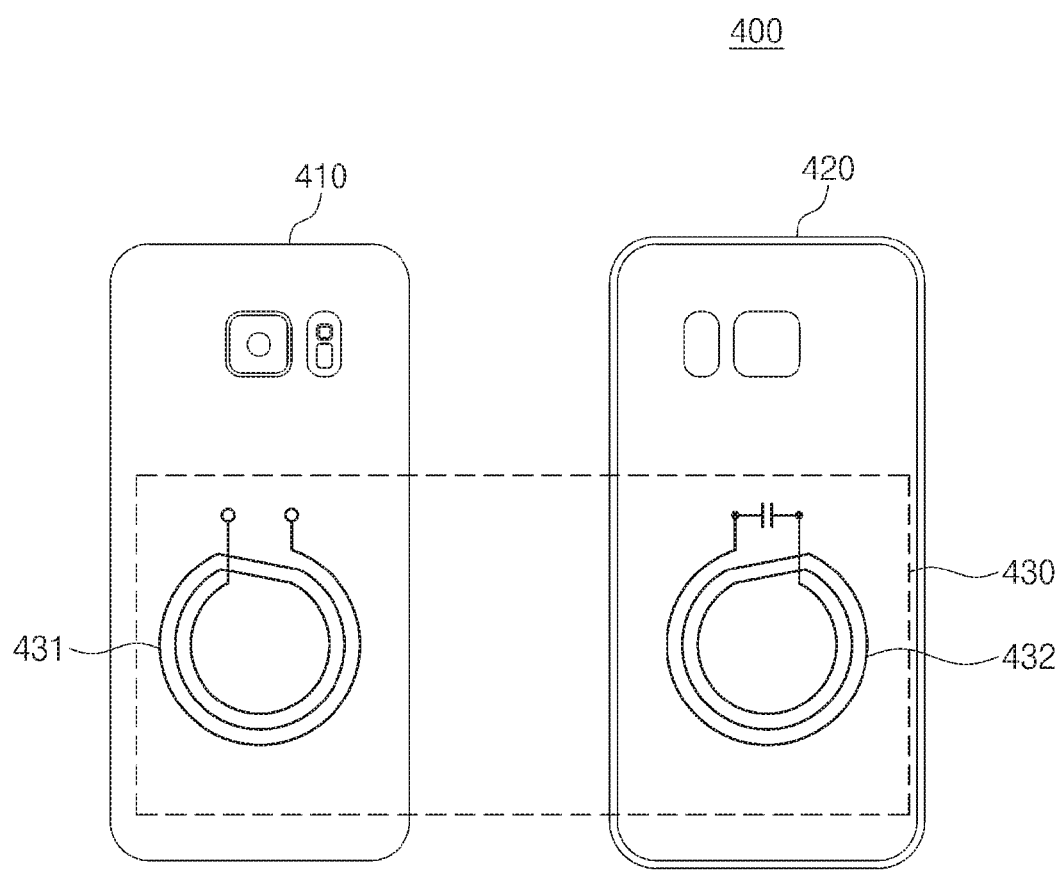
FIG. 20 is a view of an electronic device according to an exemplary embodiment.

FIGS. 19 to 30 are views illustrating applications according to exemplary embodiments. Referring to FIGS. 19 and 20, an electronic device 400 may include a mobile device 410, an accessory 420, and an antenna 430. For example, the mobile device 410 may be a smartphone, and the accessory 420 may be a cover of the smartphone. The antenna 430 may include a first coil 431 and a second coil 432. The first coil 431 may be arranged in the mobile device 410, and the second coil 432 may be arranged in the accessory 420.

If the accessory 420 is attached to the mobile device 410, the inductive coupling may be generated between inductors of the first coil 431 and the second coil 432 respectively arranged in the mobile device 410 and the accessory 420. The electronic device 400 may transmit and receive NFC signals through the inductive coupling.

Referring to FIG. 19, each of the first coil 431 and the second coil 432 may be implemented in a rectangular spiral form. Referring to FIG. 20, each of the first coil 431 and the second coil 432 may be implemented in a helical form. The number of turns, a width, a length, a location, and a thickness of each of the first coil 431 and the second coil 432 are not limited to FIGS. 19 and 20. Also, referring to FIGS. 19 and 20, an area where the first and second coils 431 and 432 are overlapped with each other exists. The overlapped area may be isolated by an insulating material. For example, a coil may be arranged in a plurality of layers through a via, and insulating materials may be arranged among the layers. Referring to FIGS. 19 and 20, a capacitor may be connected to opposite ends of the second coil 432. The capacitor may be connected to the second coil 432 for frequency tuning. In FIGS. 19 and 20, in the case where the second coil 432 does not include the capacitor, the opposite ends of the second coil 432 may be directly connected to each other. In FIGS. 19 and 20, similar to the second coil 432, the first coil 431 may further include a capacitor.

Figure 21:
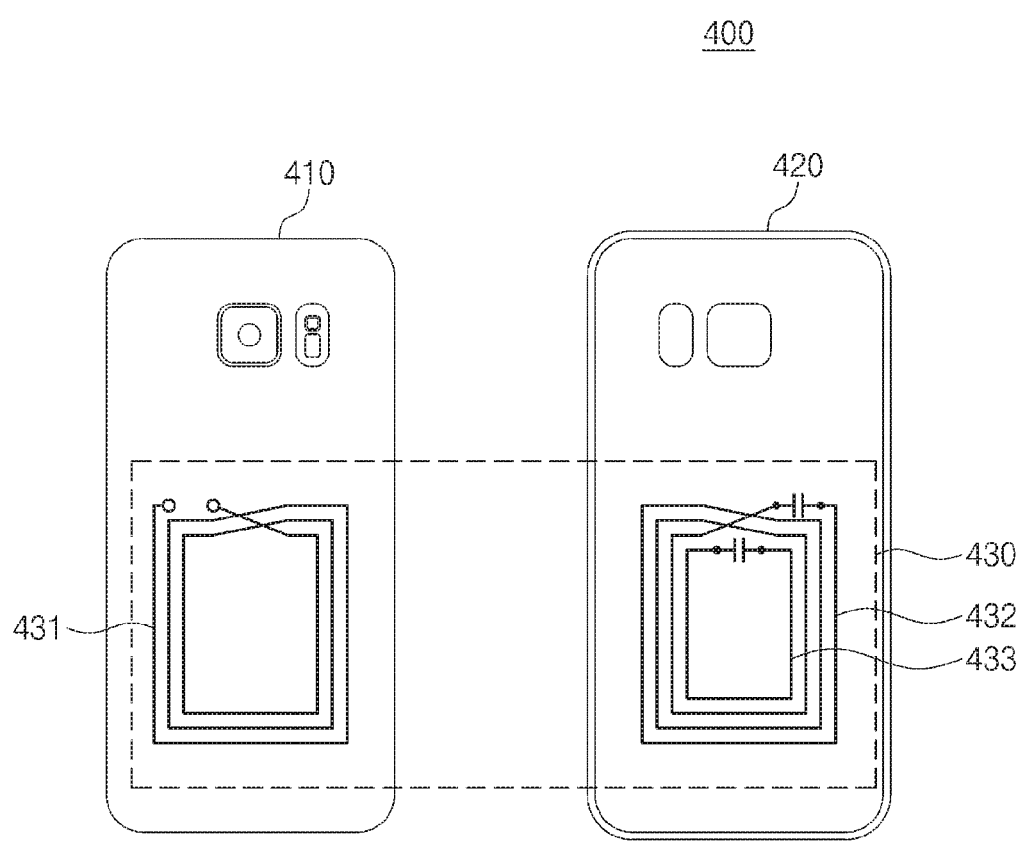
FIG. 21 is a view of an electronic device according to an exemplary embodiment.
Figure 22:
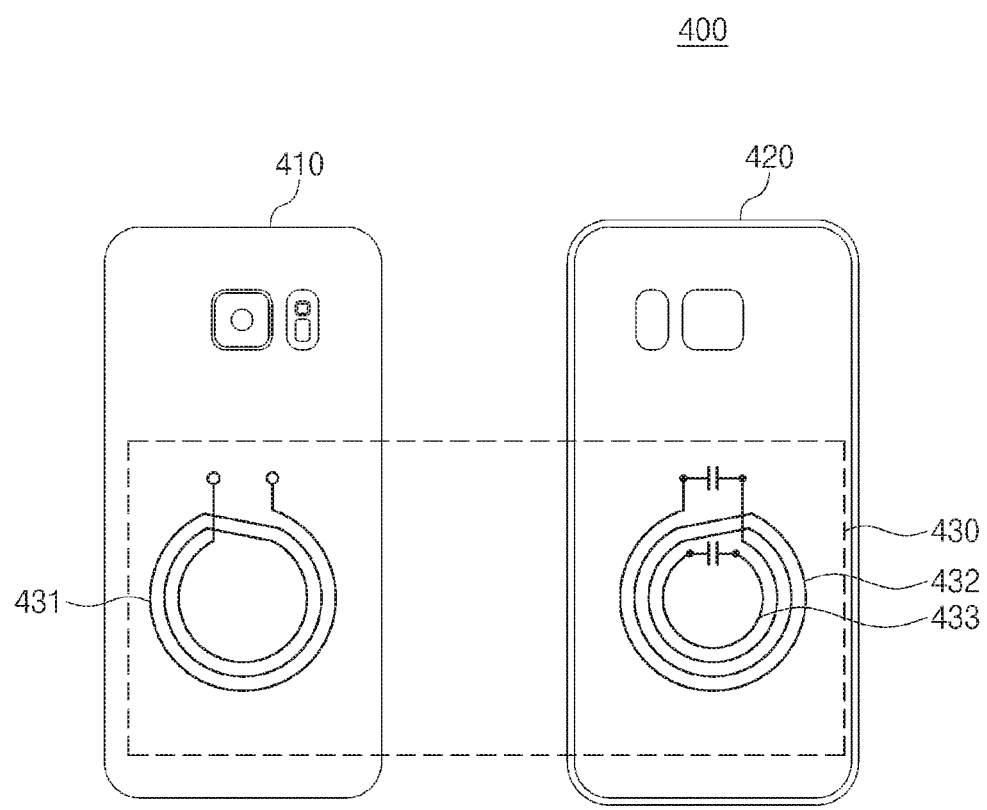
FIG. 22 is a view of an electronic device according to an exemplary embodiment.

Referring to FIGS. 21 and 22, the electronic device 400 may include the mobile device 410, the accessory 420, and the antenna 430. For example, the mobile device 410 may be a smartphone, and the accessory 420 may be a cover of the smartphone. Comparing with FIGS. 19 and 20, the antenna 430 may include a third coil 433. The third coil 433 may be arranged in the accessory 420.

If the accessory 420 is attached to the mobile device 410, the inductive coupling may be generated between inductors of the first coil 431, the second coil 432, and the third coil 433 respectively arranged in the mobile device 410 and the accessory 420. The electronic device 400 may transmit and receive NFC signals through the inductive coupling. Referring to FIG. 21, the third coil 433 may be implemented in a rectangular spiral form. Referring to FIG. 22, the third coil 433 may be implemented in a helical form. The number of turns, a width, a length, a location, and a thickness of the third coil 433 are not limited to FIGS. 21 and 22.

Referring to FIGS. 21 and 22, a capacitor may be connected to opposite ends of the third coil 433. The capacitor may be connected to the third coil 433 for frequency tuning. In FIG. 21, in the case where the third coil 433 does not include the capacitor, the opposite ends of the third coil 433 may be directly connected to each other.

Referring to FIGS. 23 to 26, the electronic device 400 may include the mobile device 410, the accessory 420, and the antenna 430. For example, the mobile device 410 may be a smartphone, and the accessory 420 may be a flip cover of the smartphone. Comparing with FIGS. 21 and 22, the antenna 430 may further include a fourth coil 434. The fourth coil 434 may be arranged in the accessory 420.

Figure 23:
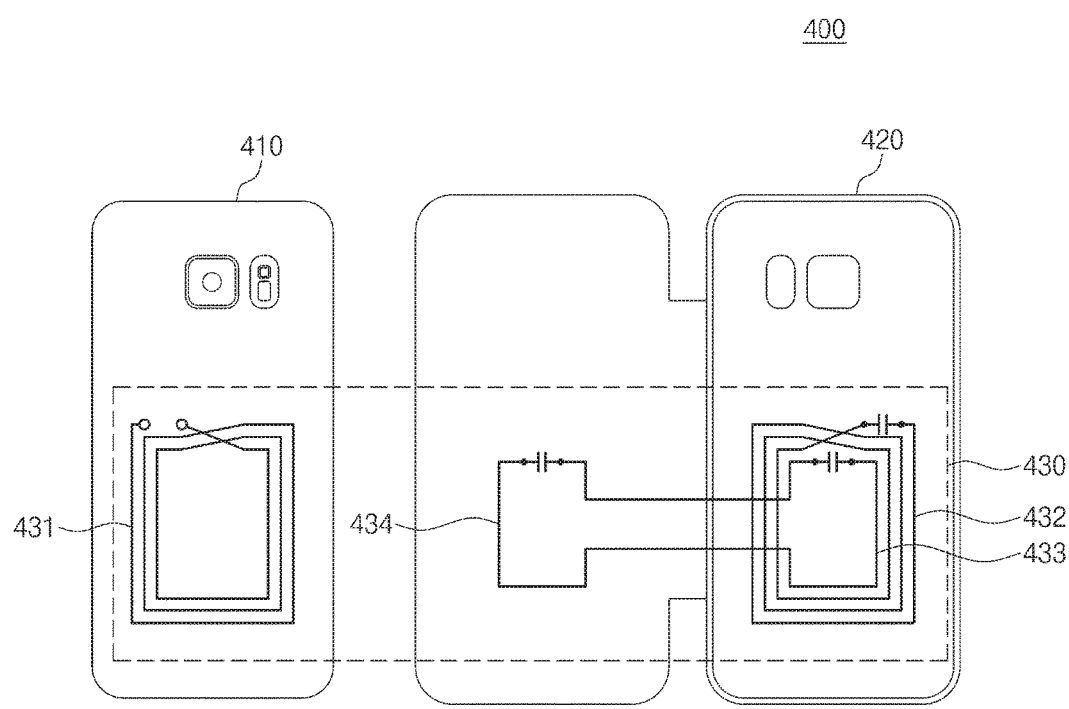
FIG. 23 is a view of an electronic device according to an exemplary embodiment.
Figure 24:
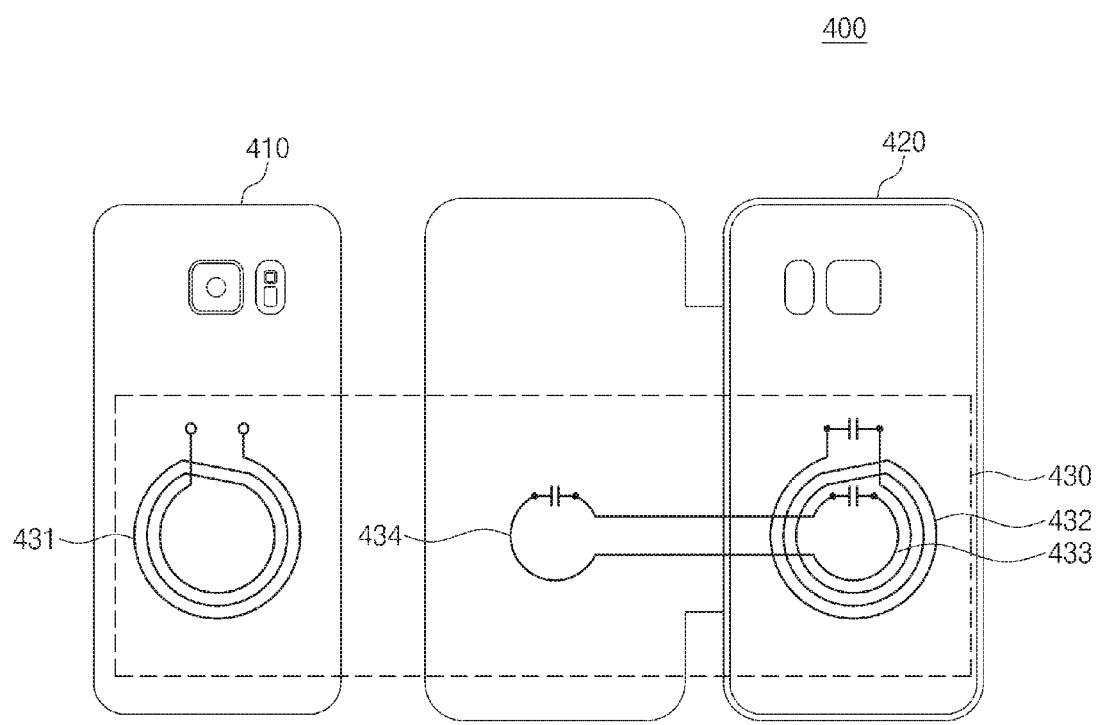
FIG. 24 is a view of an electronic device according to an exemplary embodiment.
Figure 25:
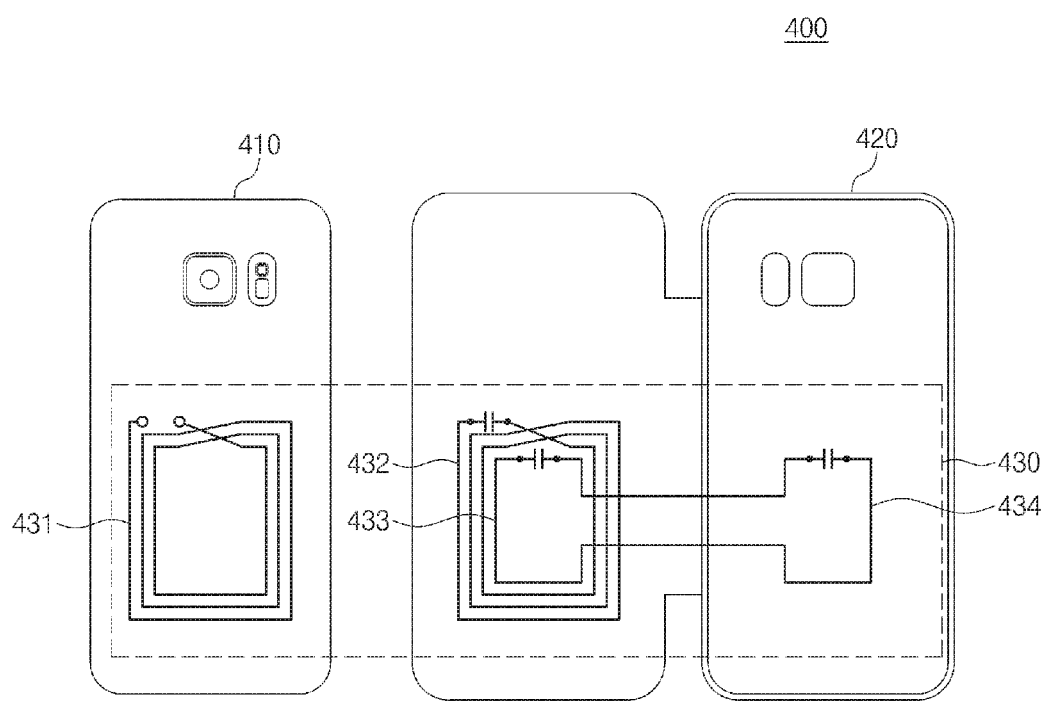
FIG. 25 is a view of an electronic device according to an exemplary embodiment.
Figure 26:
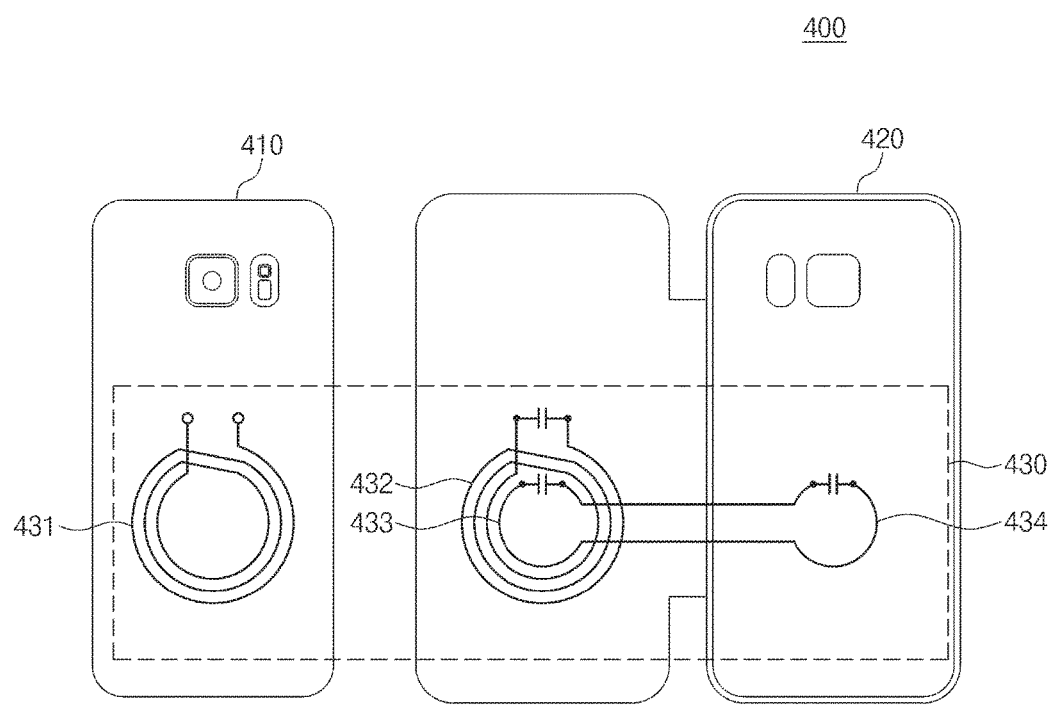
FIG. 26 is a view of an electronic device according to an exemplary embodiment.

If the accessory 420 is attached to the mobile device 410, the inductive coupling may be generated between an inductor of the first coil 431 arranged in the mobile device 410 and inductors of the second to fourth coils 434 arranged in the accessory 420. The electronic device 400 may transmit and receive NFC signals through the inductive coupling. Referring to FIGS. 23 and 25, the fourth coil 434 may be implemented in a rectangular spiral form. Referring to FIGS. 24 and 26, the fourth coil 434 may be implemented in a helical form. The number of turns, a width, a length, a location, and a thickness of the fourth coil 434 are not limited to FIGS. 23 to 26. Referring to FIGS. 23 to 26, an area where the second and third coils 432 and 433 are overlapped with each other exists. The overlapped area may be isolated by an insulating material. For example, a coil may be arranged in a plurality of layers through a via, and insulating materials may be arranged among the layers.

Referring to FIGS. 23 to 26, a capacitor may be connected to opposite ends of the fourth coil 434. The capacitor may be connected to the fourth coil 434 for frequency tuning. In the case where the fourth coil 434 does not include the capacitor, the opposite ends of the fourth coil 434 may be directly connected to each other. Referring to FIGS. 23 to 26, the fourth coil 434 may be connected with the third coil 433. As another example, the fourth coil 434 may be arranged to be separated from the third coil 433.

Referring to FIGS. 23 and 24, the second coil 432 and the third coil 433 may be arranged on the rear surface of the flip cover, and the fourth coil 434 may be arranged on the front surface of the flip cover. Referring to FIGS. 25 and 26, the second coil 432 and the third coil 433 may be arranged on the front surface of the flip cover, and the fourth coil 434 may be arranged on the rear surface of the flip cover.

Referring to FIGS. 19 to 26, a smartphone is exemplified as the mobile device 410, but the mobile device 410 is not limited to the smartphone. A cover or a flip cover of the smartphone is exemplified as the accessory 420, but the accessory 420 is not limited to the cover or flip cover of the smartphone.

Figure 27:
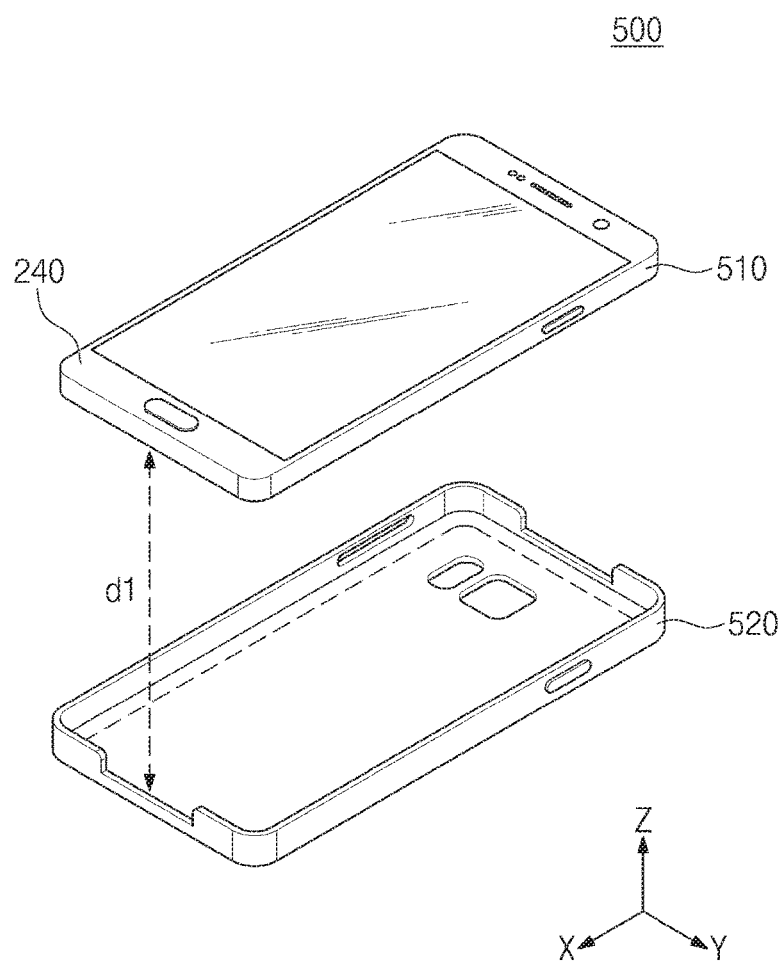
FIG. 27 is a view of an electronic device according to an exemplary embodiment.

Referring to FIG. 27, an electronic device 500 may include a mobile device 510 and an accessory 520. For example, the mobile device 510 may be a smartphone, and the accessory 520 may be a cover of the smartphone. An exemplary embodiment in FIG. 27 illustrates a distance d1 between the mobile device 510 and the accessory 520. The distance d1 may be determined to be suitable for using the inductive coupling between inductors of coils. For example, the distance d1 may be not more than 5 mm. Also, distances between planes of coils arranged in the interior of the mobile device 510 and the accessory 520 may be determined to be suitable for using the inductive coupling. For example, each distance is not more than 10 mm.

Figure 28:
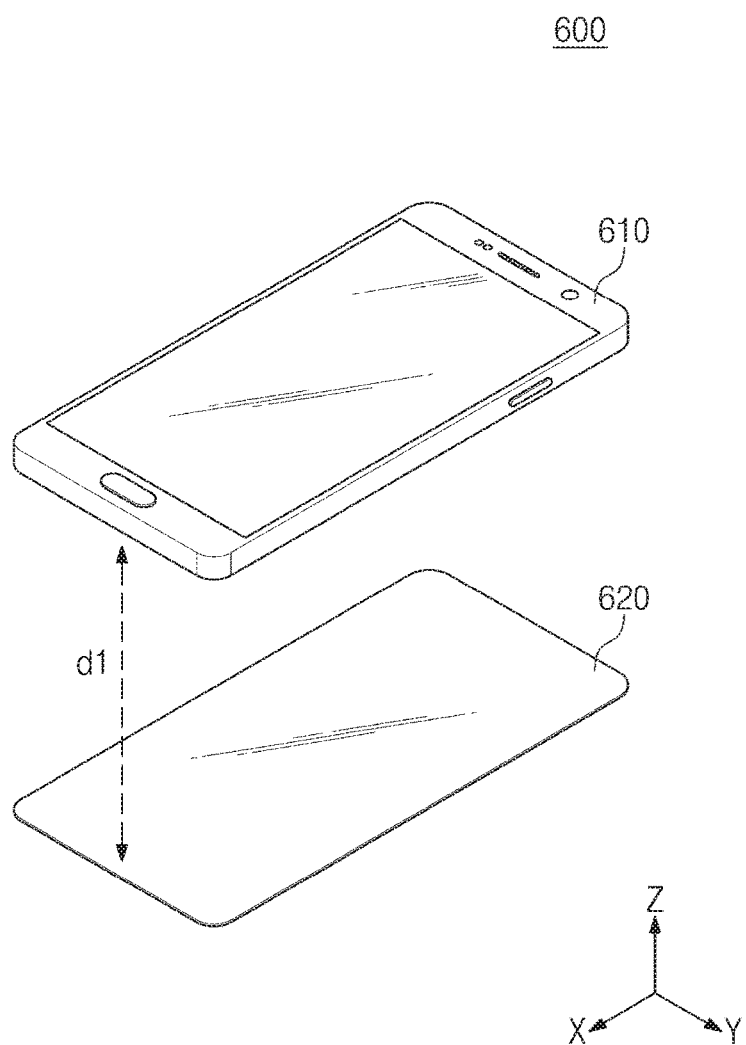
FIG. 28 is a view of an electronic device according to an exemplary embodiment.

Referring to FIG. 28, an electronic device 600 may include a mobile device 610 and an accessory 620. For example, the mobile device 610 may be a smartphone, and the accessory 620 may be a film or a sticker of the smartphone. The accessory 620 may be a film for preventing a scratch or an impact of the mobile device 610. The accessory 620 may be a sticker for improving the aesthetic sense of the mobile device 610.

Referring to FIG. 28, the accessory 620 may be attached on a rear surface of the mobile device 610 instead of a front surface of the mobile device 610, on which a screen is displayed. As an example, a form of the accessory 620 may be manufactured to be similar to a form of the mobile device 610 as illustrated in FIG. 28 or may be manufactured to be different from the form of the mobile device 610 illustrated in FIG. 28. As another example, the accessory 620 may be attached on the front surface of the mobile device 610, on which a screen is displayed. Alternatively, the accessory 620 may be attached on a lateral surface of the mobile device 610. Referring to FIG. 28, a smartphone is exemplified as the mobile device 610, but the mobile device 610 is not limited to the smartphone. Referring to FIG. 28, a film or a sticker of the smartphone is exemplified as the accessory 620, but the accessory 620 is not limited to the film or sticker of the smartphone.

An exemplary embodiment of FIG. 28 illustrates a distance d1 between the mobile device 610 and the accessory 620. The distance d1 may be determined to be suitable for using the inductive coupling between inductors of coils. For example, the distance d1 may be not more than 5 mm. Also, distances between planes of coils arranged in the interior of the mobile device 610 and on the accessory 620 may be determined to be suitable for using the inductive coupling. For example, each distance may be not more than 10 mm.

Figure 29:
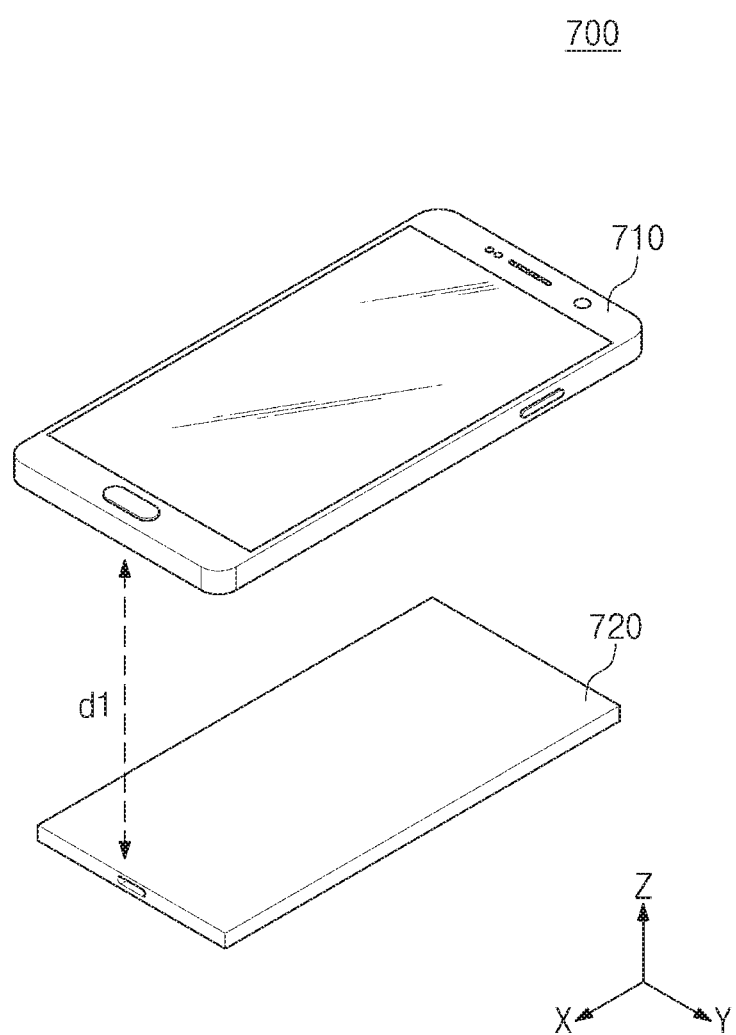
FIG. 29 is a view of an electronic device according to an exemplary embodiment.

Referring to FIG. 29, an electronic device 700 may include a mobile device 710 and an accessory 720. For example, the mobile device 710 may be a smartphone, and the accessory 720 may be an auxiliary battery of the smartphone. Referring to FIG. 29, a smartphone is exemplified as the mobile device 710, but the mobile device 710 may not be limited to the smartphone. Referring to FIG. 29, the auxiliary battery of the smartphone is exemplified as the accessory 720, but the accessory 720 is not limited to the auxiliary battery of the smartphone.

An exemplary embodiment of FIG. 29 illustrates a distance d1 between the mobile device 710 and the accessory 720. The distance d1 may be determined to be suitable for using the inductive coupling between inductors of coils. For example, the distance d1 may be not more than 5 mm. Also, distances between planes of coils arranged in the interior of the mobile device 710 and the accessory 720 may be determined to be suitable for using the inductive coupling. For example, the distance d1 may be not more than 10 mm.

Figure 30:
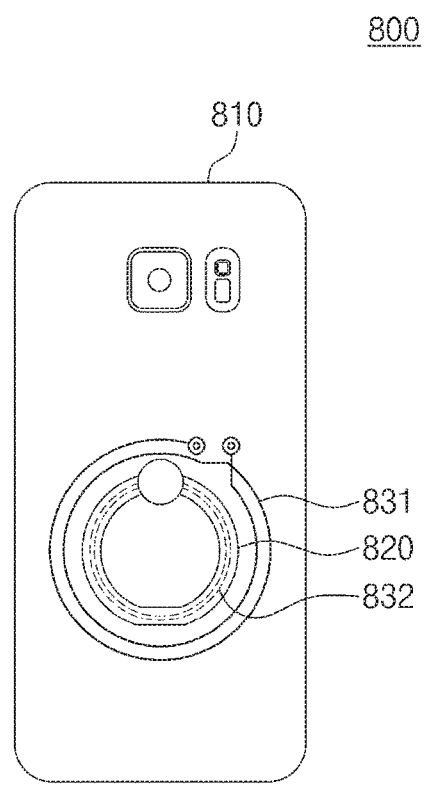
FIG. 30 is a view of an electronic device according to an exemplary embodiment.

Referring to FIG. 30, an electronic device 800 may include a mobile device 810 and an accessory 820. For example, the mobile device 810 may be a smartphone, and the accessory 820 may be a smart grip.

Referring to FIG. 30, an electronic device 820 may include a part of an antenna 830. Considering a form of the smart grip, a form of a second coil 832 may be a helical form. The electronic device 810 may include a part of the antenna 830. Here, considering the inductive coupling between an inductor of the second coil 832 and an inductor of the first coil 831, a form of the first coil 831 may be a helical form. A distance between the mobile device 810 and the accessory 820 may be determined to be suitable for using the inductive coupling between inductors of coils. For example, the distance may be not more than 5 mm. Also, distances between planes of coils arranged in the interior of the mobile device 810 and in the accessory 820 may be determined to be suitable for using the inductive coupling. For example, each distance is not more than 10 mm.

Non-limiting examples of applications according to exemplary embodiments are illustrated in FIGS. 19 to 30. Unlike the mobile devices illustrated in FIGS. 19 to 30, various mobile devices including the smartphone may be used. For example, the mobile devices may include a tablet PC, a notebook computer, a digital camera, a smart ring, a smart watch, etc. Also, various accessories that are attachable to a mobile device may be used. For example, the accessories may include a cover, a film, a sticker, an antiskid pad, a smart grip, an auxiliary battery, etc.

Figure 31:
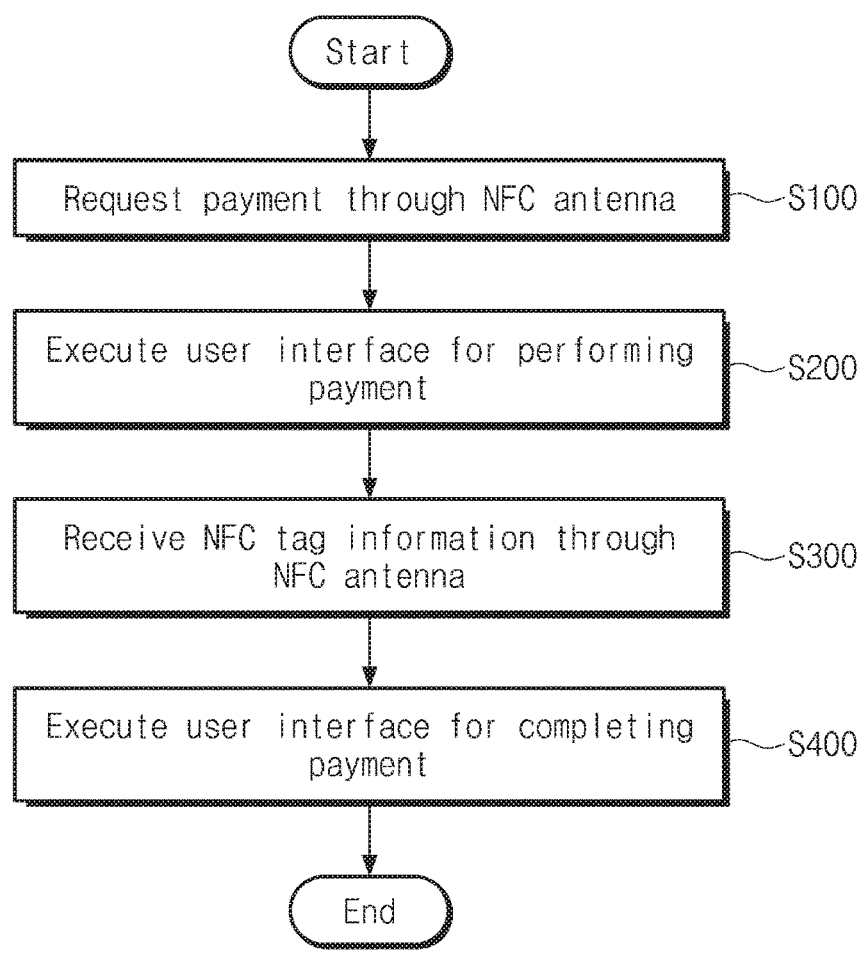
FIG. 31 is a flowchart illustrating a mobile payment method according to an exemplary embodiment.

FIG. 31 is a flowchart illustrating a mobile payment method according to an exemplary embodiment. Referring to FIG. 31, the mobile payment method may be executed by the electronic device 300 (refer to FIG. 18) according to an exemplary embodiment. The electronic device 300 (refer to FIG. 18) may be implemented like applications illustrated in FIGS. 19 to 30. FIG. 31 will be described with reference to FIGS. 18 and 32 to 35.

In operation S100, the electronic device 300 may receive a payment request from the outside through the antenna 330. A method of requesting payment may be variously implemented. For example, the electronic device 300 may receive a payment request from the outside through wired/wireless communication of the network module 316. Afterwards, the accessory 320 may be attached to the mobile device 310. Alternatively, the accessory 320 may be attached to the mobile device 310 in advance.

Figure 32:
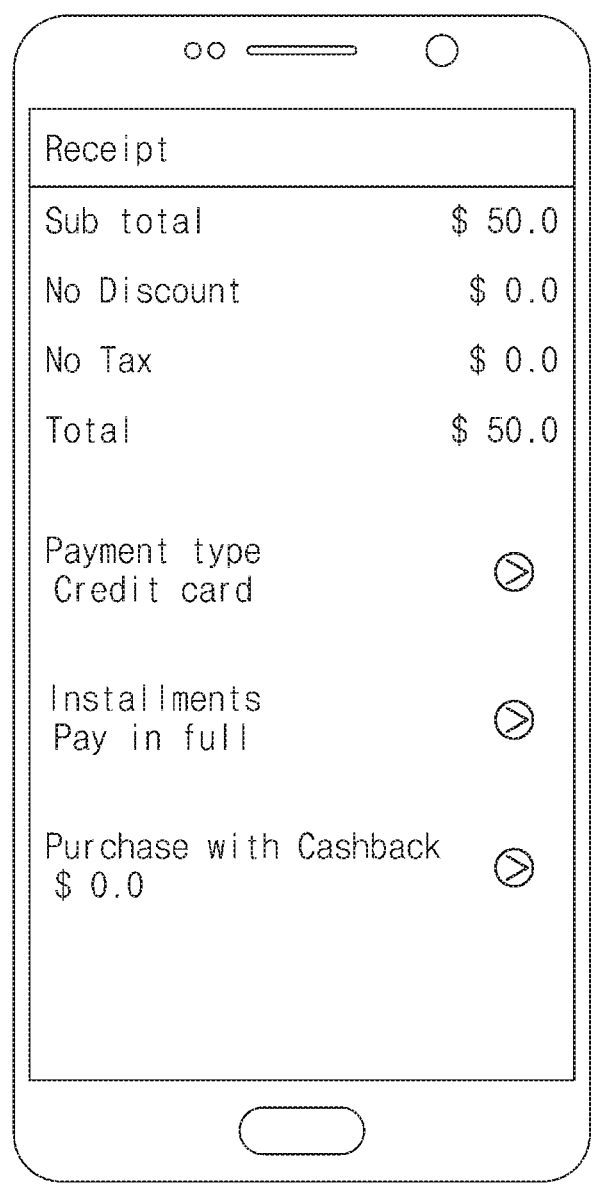
FIG. 32 is a view illustrating a user interface for performing payment according to an exemplary embodiment.

In operation S200, a user interface for performing payment may be executed. In this case, the user interface may be displayed on the display module 318, for example, as a graphical user interface. In the case where the accessory 320 is attached to the mobile device 310, the user interface for performing payment may be executed by the application processor 311. In the case where the accessory 320 is detached from the mobile device 310, the user interface for performing payment is not executed. Alternatively, the user interface for performing payment may be executed according to the payment request from the outside regardless of whether the accessory 320 is attached to the mobile device 310. FIG. 32 is a view illustrating a user interface for performing payment executed in operation S200 of FIG. 31. However, the user interface executed in operation S200 is not limited to FIG. 32.

Figure 33:
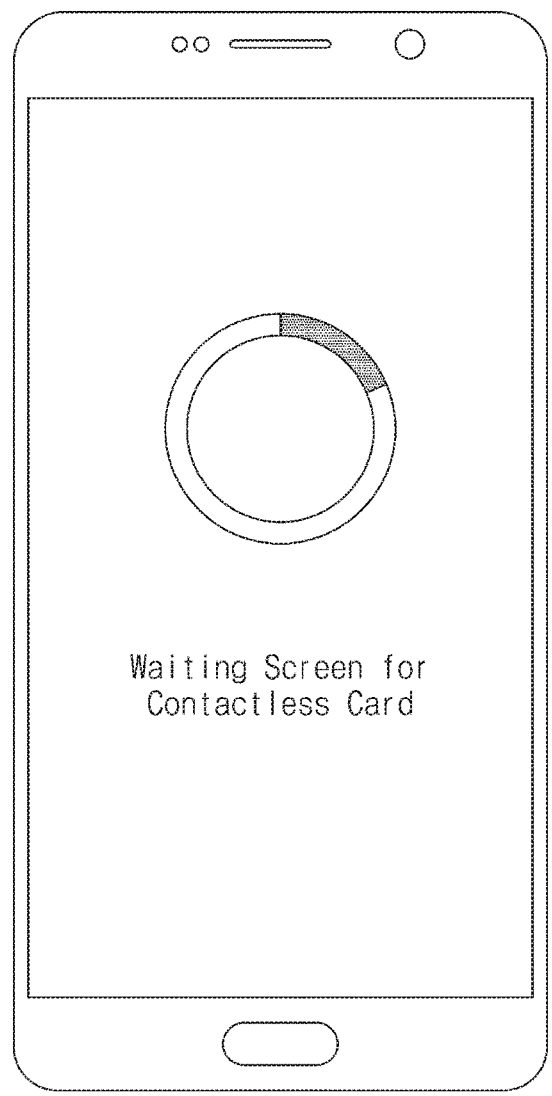
FIG. 33 is a view illustrating a user interface according to an exemplary embodiment.

In operation S300, an NFC tag may be in contact with the accessory 320. Here, the NFC tag may be a credit card, a transportation card, or any other mobile device. NFC tag information may be received from the mobile device 310 through the antenna 330. For example, the NFC tag information may mean a variety of information such as valid information, an expiration date, a usage of credit card, and a maximum limit of a credit card. The application processor 311 may make a payment based on the received information. FIG. 33 is a view illustrating a user interface for a contact executed in operation S300 of FIG. 31. However, the user interface executed in operation S300 is not limited to FIG. 33.

Figure 34:
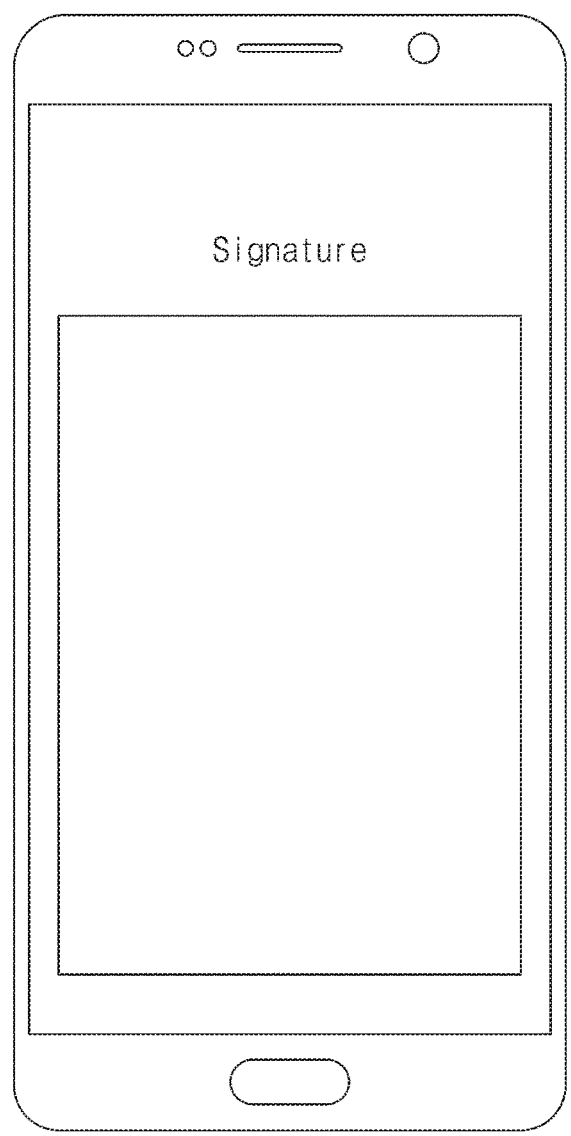
FIG. 34 is a view illustrating a user interface for completing payment according to an exemplary embodiment.
Figure 35:
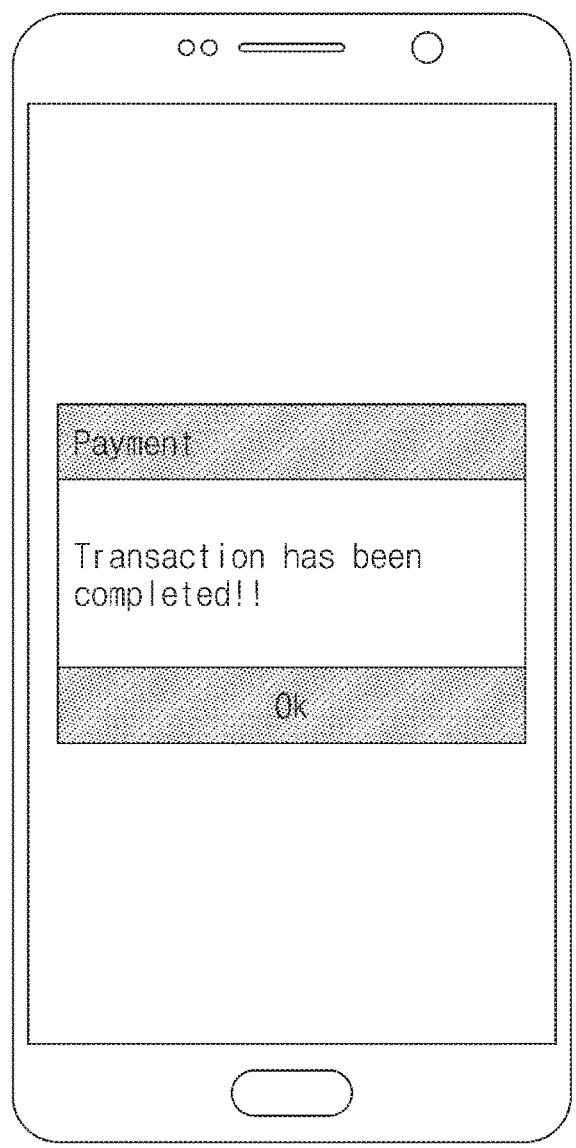
FIG. 35 is a view illustrating a user interface for completing payment according to an exemplary embodiment.

In operation S400, a user interface for completing payment may be executed. The user interface for completing payment may include a screen on which a user who has the NFC tag may sign. The user interface for completing payment may also include a screen indicating that payment is completed. FIGS. 34 and 35 are views illustrating a user interface for completing payment executed in operation S400 of FIG. 31. However, the user interface executed in operation S400 is not limited to FIGS. 34 and 35.

An electronic device according to an exemplary embodiment may improve the degree of freedom in placement of an antenna by using an accessory.

While exemplary embodiments been described, it will be apparent to those skilled in the art that various changes and modifications may be made without departing from the spirit and scope of the inventive concept. Therefore, it should be understood that the above exemplary embodiments are not limiting, but illustrative.

What is claimed is:

1. An electronic device comprising:
   a near field communication (NFC) antenna comprising a first coil, a second coil, and a third coil that are separated from each other; and
   a mobile device comprising the first coil,
   wherein the second coil and the third coil are arranged on an outside of the mobile device, and the second coil and the third coil are included in an accessory that is removably attachable to the mobile device,
   wherein the mobile device comprises an NFC transceiver configured to transmit and receive NFC signals via the first coil, the second coil, and the third coil under control of the mobile device,
   wherein when the accessory is attached to the mobile device, a distance between the first coil and the second coil is from approximately 0 mm to approximately 10 mm, and inductive coupling is generated between the first coil and the second coil, and
   wherein the second coil and the third coil are overlapped with each other in an area of the accessory, at least one of the second coil and the third coil is arranged in a plurality of layers through a via, and insulating materials are arranged among the plurality of layers.

2. The electronic device of claim 1, wherein each of the first coil and the second coil has a rectangular spiral form or a helical form.

3. The electronic device of claim 1, wherein the mobile device further comprises:
   an application processor configured to provide a program for exchanging data with an external device, a card program, or a card reader program, and
   wherein the NFC transceiver is configured to transmit and receive the NFC signals under control of the application processor.

4. The electronic device of claim 3, further comprising a matching circuit connected between the NFC transceiver and the first coil of the antenna, the matching circuit comprising an electromagnetic compatibility (EMC) filter comprising inductor elements and capacitor elements,
   wherein the capacitor elements are configured to match an impedance between the NFC transceiver and the antenna.

5. The electronic device of claim 1, wherein the mobile device further comprises:
   a hall sensor integrated circuit configured to sense whether the accessory is attached to the mobile device.

6. The electronic device of claim 1, wherein each of the first coil, the second coil, and the third coil has a rectangular spiral form or a helical form.

7. The electronic device of claim 1, wherein when the accessory is attached to the mobile device, inductive coupling is generated between the first coil, the second coil, and the third coil.

8. The electronic device of claim 1, wherein the accessory comprises at least one of the a cover, a sticker, an antiskid pad, a film, an auxiliary battery, and a smart grip.

9. The electronic device of claim 1, wherein the accessory has a space to accommodate the mobile device therein, and the second coil is provided in an interior of the accessory.

10. The electronic device of claim 1, wherein the NFC antenna further comprises a fourth coil which is included in the accessory and is separated from the first coil, the second coil, and the third coil.

11. The electronic device of claim 10, wherein the accessory is a flip cover of the mobile device,
    wherein the second coil and the third coil are arranged on a front surface of the flip cover, and
    wherein the fourth coil is arranged on a rear surface of the flip cover.

12. The electronic device of claim 10, wherein the accessory is a flip cover of the mobile device,
    wherein the second coil is arranged on a front surface of the flip cover, and
    wherein the third coil and the fourth coil are arranged on a rear surface of the flip cover.

13. A near field communication (NFC) antenna comprising:
    a first coil that is arranged in a mobile device; and
    a second coil and a third coil that are separated from the first coil and are arranged on an outside of the mobile device,
    wherein the second coil is included in an accessory that is removably attachable to the mobile device,
    wherein the mobile device comprises an NFC transceiver configured to transmit and receive NFC signals via the first coil, the second coil, and the third coil under control of the mobile device,
    wherein when the accessory is attached to the mobile device, a distance between the first coil and the second coil is from approximately 0 mm to approximately 10 mm, and inductive coupling is generated between the first coil and the second coil, and
    wherein the second coil and the third coil are overlapped with each other in an area of the accessory, at least one of the second coil and the third coil is arranged in a plurality of layers through a via, and insulating materials are arranged among the plurality of layers.

14. The NFC antenna of claim 13, wherein each of the first coil and the second coil has a rectangular spiral form or a helical form.

* * * * *